US012637061B2

(12) United States Patent
Salter et al.

(10) Patent No.: US 12,637,061 B2
(45) Date of Patent: May 26, 2026

(54) METHODS AND APPARATUS FOR VEHICLE TURNING IN CONFINED SPACES

(71) Applicant: Ford Global Technologies, LLC, Dearborn, MI (US)

(72) Inventors: Stuart C. Salter, White Lake, MI (US); Kenneth Patrick Mchugh, Canton, MI (US); Terry R. Lobsinger, Farmington Hills, MI (US); Brandon Cameron, Canton, MI (US); William Wurz, San Francisco, CA (US); Z Deljevic, Plymouth, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1248 days.

(21) Appl. No.: 17/511,317

(22) Filed: Oct. 26, 2021

(65) Prior Publication Data

US 2023/0130534 A1     Apr. 27, 2023

(51) Int. Cl.
| | |
|---|---|
| *B60W 30/045* | (2012.01) |
| *B60L 7/26* | (2006.01) |
| *B60W 10/08* | (2006.01) |
| *B60W 10/184* | (2012.01) |
| *B60W 10/20* | (2006.01) |

(52) U.S. Cl.
CPC ............. *B60W 30/045* (2013.01); *B60L 7/26* (2013.01); *B60W 10/08* (2013.01); *B60W 10/184* (2013.01); *B60W 10/20* (2013.01); *B60W 2552/40* (2020.02); *B60W 2710/08* (2013.01); *B60W 2710/18* (2013.01); *B60W 2710/207* (2013.01)

(58) Field of Classification Search
CPC .... B60W 10/08; B60W 10/184; B60W 10/20; B60W 2552/40; B60W 2710/08; B60W 2710/18; B60W 2710/207; B60W 30/045; B60L 7/26
USPC .......................................................... 701/41
See application file for complete search history.

(56) References Cited

U.S. PATENT DOCUMENTS

| | | | |
|---|---|---|---|
| 4,720,790 | A | 1/1988 | Miki et al. |
| 5,351,779 | A * | 10/1994 | Yamashita ............. B60K 28/16 180/197 |
| 7,377,600 | B2 * | 5/2008 | Motoyama ............ B60T 8/1755 303/142 |

(Continued)

FOREIGN PATENT DOCUMENTS

| | | | | |
|---|---|---|---|---|
| EP | 2769179 B1 | * | 2/2017 | ............ B60W 10/16 |
| JP | H072078 A | * | 6/1993 | ............... B60T 8/58 |
| RU | 2737069 C1 | * | 11/2020 | ............... B60T 8/00 |

*Primary Examiner* — Jelani A Smith

(74) *Attorney, Agent, or Firm* — Lorne Forsythe; Hanley, Flight & Zimmerman, LLC

(57) ABSTRACT

Methods, apparatus, systems, and articles of manufacture for vehicle turning in confined spaces are disclosed herein. An example apparatus disclosed herein instructions, at least one memory, a processor to execute the instructions to operate a first brake of a first wheel of a vehicle, operate a second brake of a second wheel of the vehicle, determine a frictional coefficient of a driving surface of the vehicle by rotating a third wheel of the vehicle, determine based on the frictional coefficient, if a turn command can be conducted by the vehicle, and when the turn command can be conducted, conduct the turn command.

20 Claims, 17 Drawing Sheets

(56)    References Cited

U.S. PATENT DOCUMENTS

| | | | | |
|---|---|---|---|---|
| 8,565,976 | B2 | 10/2013 | Kojo et al. | |
| 9,983,586 | B2 * | 5/2018 | Borinato | G05D 1/021 |
| 10,272,942 | B2 | 4/2019 | Lian et al. | |
| 10,696,321 | B2 | 6/2020 | Riot et al. | |
| 12,122,403 | B2 * | 10/2024 | Kim | B60W 60/00 |
| 2009/0184572 | A1 * | 7/2009 | Yamada | B60T 8/1755 |
| | | | | 303/140 |
| 2016/0139598 | A1 * | 5/2016 | Ichikawa | B60W 30/09 |
| | | | | 701/25 |
| 2018/0099694 | A1 * | 4/2018 | Scheibel | B62D 5/0484 |
| 2020/0079381 | A1 * | 3/2020 | Lombrozo | B60W 60/0015 |
| 2020/0257292 | A1 * | 8/2020 | Zhao | B60Q 9/00 |
| 2021/0139018 | A1 * | 5/2021 | Schwindt | H04W 4/38 |
| 2022/0105943 | A1 * | 4/2022 | Oh | B60T 8/1764 |
| 2024/0278756 | A1 * | 8/2024 | Dijken | B60T 8/1761 |
| 2024/0326878 | A1 * | 10/2024 | Danylov | B60W 40/08 |

* cited by examiner

900

START

ACCESS TURN COMMAND — 902

RECEIVE VEHICLE SENSOR DATA — 904

IDENTIFY ENVIROMENTAL OBSTACLES BASED ON SENSOR DATA — 906

DETERMINE FRICTIONAL COEFFICIENT OF DRIVING SURFACE OF VEHICLE — 908

BRAKE WHEEL AT CENTER OF A TURN RADIUS ASSOCIATED WITH TURN COMMAND — 910

OPERATE WHEEL DIAGONOLLY OPPOSED TO BRAKED WHEEL — 912

ADDITIONAL PIVOT REQUIRED TO COMPLETE TURN COMMAND? — 914

YES

NO

END

METHODS AND APPARATUS FOR VEHICLE TURNING IN CONFINED SPACES

FIELD OF THE DISCLOSURE

This disclosure relates generally to vehicle steering systems and, more particularly, to methods and apparatus for vehicle turning in confined spaces.

BACKGROUND

Vehicle steering systems convert user inputs, often input using a steering wheel, into movements of the vehicle wheels, thereby changing the direction of travel of the vehicle. Some vehicle steering systems include direct mechanical connections between the user input and the vehicle wheels. In some such examples, the vehicle steering systems are assisted steering systems, which include components that amplify the force of user inputs. Other vehicle steering systems are steer-by-wire systems, which convert user inputs into an electrical inputs used to articulate a wheel controller that is not mechanically directly connected to the user input.

SUMMARY

An example apparatus disclosed herein instructions, at least one memory, a processor to execute the instructions to operate a first brake of a first wheel of a vehicle, operate a second brake of a second wheel of the vehicle, determine a frictional coefficient of a driving surface of the vehicle by rotating a third wheel of the vehicle, determine based on the frictional coefficient, if a turn command can be conducted by the vehicle, and when the turn command can be conducted, conduct the turn command.

An example apparatus disclosed herein instructions at least one memory, a processor to execute the instructions to access a turn command, the turn command to move a vehicle from a first position to a second position, determine, based on the turn command and the first position, a first brake command and a first motor command, the first brake command to brake a first brake of the vehicle, the first motor command to operate a first motor of the vehicle, and execute, substantially simultaneously, the first brake command and the first motor command, to move the vehicle from the first position to the second position.

An example method disclosed herein includes accessing a turn command, the turn command to move a vehicle from a first position to a second position, determining, based on the turn command and the first position, a first brake command and a first motor command, the first brake command to brake a first brake of the vehicle, the first motor command to operate a first motor of the vehicle, and executing, substantially simultaneously, the first brake command and the first motor command, to move the vehicle from the first position to the second position.

Figure 1:
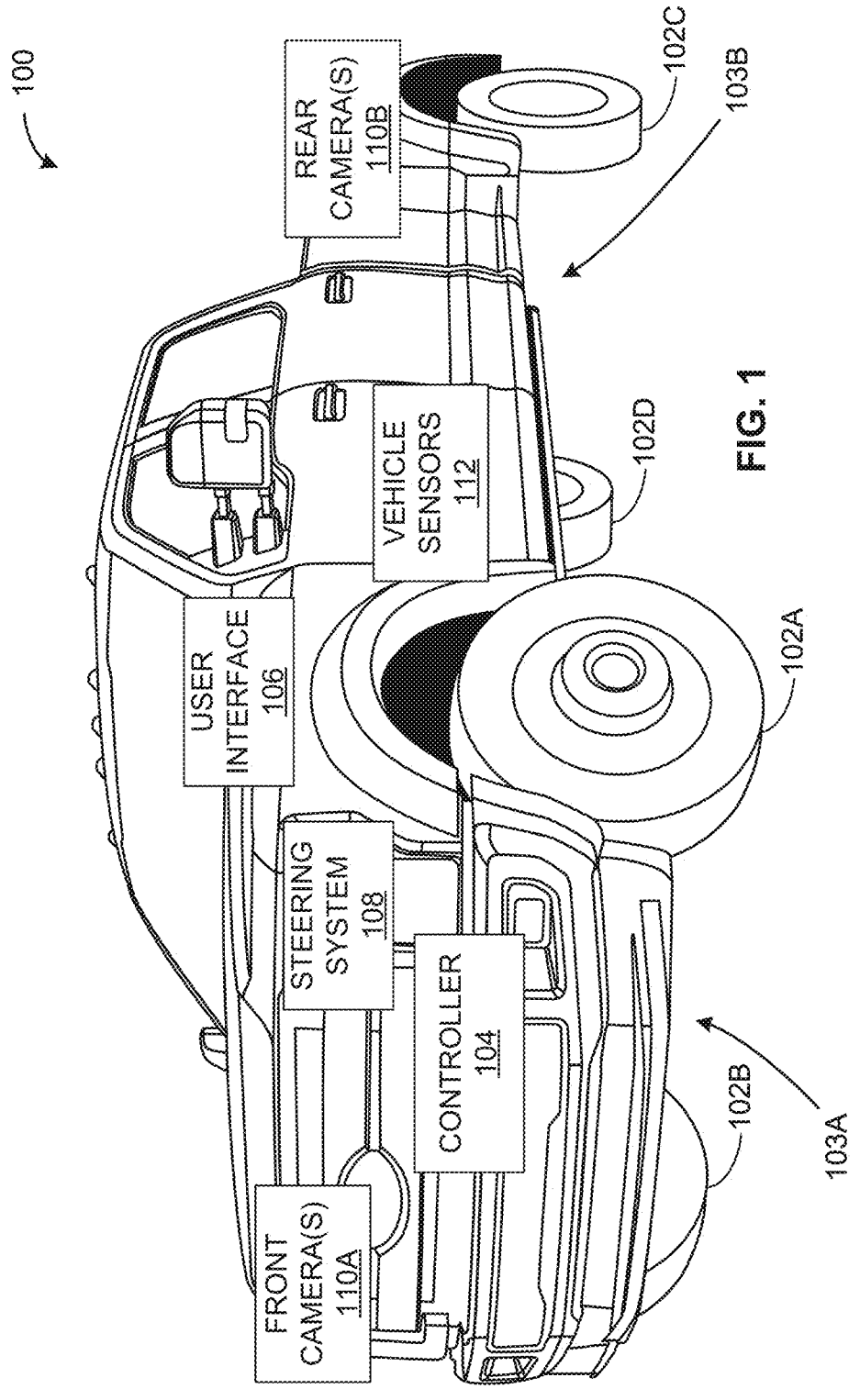
FIG. 1 is a perspective view of a vehicle in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein "substantially simultaneously" refers to two events which occur at the same time in a near instantaneous manner recognizing there may be real world delays for computing time, transmission, human perception, etc.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operation and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used interchangeably to refer to directions parallel to the vertical axis.

As used herein, the term "turn command" refers to an input to a vehicle to cause the vehicle to move from a first position to a second position and includes an orientation change of the vehicle. Turn commands can be generated by a user of the vehicle (e.g., an operator of the vehicle, etc.) and/or by an autonomous driving module of the vehicle. As used herein, the terms "frictional coefficient" and "coefficient of friction" are used interchangeably as a scalar value that describes the ratio of the frictional force exerted between two objects and the normal force between the two objects. While the coefficients of friction determined herein are typically static coefficients of friction, the kinetic coefficient of friction may also be determined as appropriate.

As used herein, the term "fully brake" refers to an engagement of a vehicle braking system that prevents a wheel of the vehicle from substantially rotating about the lateral axis of the vehicle when power is provided by a powertrain of the vehicle. As used herein, the term "partially brake" refers to an engagement of a braking system of vehicle that does not fully brake a wheel of the vehicle.

Commercial vehicles, like pick-up trucks, are often used in warehouses and other confined spaces. These confined spaces can make vehicle steering difficult, as many obstacles of the confined space can inhibit vehicle navigation. Additionally, vehicles with comparatively large turning radii can make executing turns in confined spaces difficult. In recent years, electric vehicles (EV) have become more common. Unlike conventional vehicles with combustion engines, EVs often include multiple motors. For example, many electric vehicles include electric motors which drive the individual axles of the vehicle. As such, some EVs enable independent operation of vehicle axles. In other examples, some EVs have individual wheels with corresponding electric motors, which allow the power to each wheel to be individual controlled.

Examples disclosed herein improve vehicle steering in confined spaces. Examples disclosed herein include a steering mode for a vehicle that enables smaller slower steering wheel inputs to yield finer steering outputs and larger faster steering wheel inputs to yield larger steering outputs. Some examples disclosed herein include analyzing the driving conditions, like the frictional coefficient and surrounding obstacles, to determine if a turn command is executable by a car. Some such examples disclosed herein include determining the frictional coefficient by fully braking a plurality of wheels and operating a wheel to measure wheel slip and approximate a frictional coefficient of the driving surface. In some examples disclosed herein, if the turn command is not executable, the vehicle can issue an instruction to a user of the vehicle to change the frictional coefficient of the driving surface.

Examples disclosed herein can decrease the turning radius of a vehicle by selectively braking one or more wheels of the vehicle and operating motors of the vehicle. Some examples disclosed herein include fully braking a wheel and operating a wheel diagonally opposed to the fully braked wheel, thereby pivoting the vehicle about the fully braked wheel. Some examples disclosed include varying individual wheel speeds by selecting braking wheels and operating vehicle motor(s) while executing a turn command to decrease the turning radius of the vehicle. Some examples disclosed herein include executing a tank turn by rotating diagonally opposed wheels in opposite directions and shifting weight off of undriven wheels. In some such examples disclosed herein, if the vehicle determines a collision can occur while executing a tank turn, the vehicle can shift the axis of the tank turn.

FIG. 1 is a perspective view of a vehicle 100 in which examples disclosed herein can be implemented. In the illustrated example of FIG. 1, the vehicle 100 includes an example first wheel 102A, an example second wheel 102B, an example third wheel 102C, and an example fourth wheel 102D. In the illustrated example of FIG. 1, the vehicle 100 includes an example first axle 103A, which includes the wheels 102A, 102B, and an example second axle 103B, which includes the wheels 102C, 102D. In the illustrated example of FIG. 1, the vehicle 100 includes an example controller 104, an example user interface 106, an example steering system 108, example front cameras 110A, example rear camera 110B, and example vehicle sensors 112.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle. In some such examples, the vehicle 100 can include multiple motors (e.g., a motor associated with each of the wheels 102A, 102B, 102C, 102D, a motor associated with each of the axles 103A, 103B, etc.).

The wheels 102A, 102B, 102C, 102D include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 102A and the second wheel 102B are front wheels and the third wheel 102C and the fourth wheel 102D are rear wheels. In the illustrated example of FIG. 1, the first wheel 102A and the third wheel 102C are driver-side wheels and the second wheel 102B and the fourth wheel 102D are passenger-side wheels.

The controller 104 controls and/or regulates the systems of the vehicle 100. The controller 104 can communicate with the other components and/or systems of the vehicle 100 via a controller area network (CAN) bus of the vehicle 100. Additionally or alternatively, the controller 104 can communicate with other components of a system 200 (FIG. 2) via an independent communication system (e.g., an electrical communication system, a hydraulic communication system, etc.). The controller 104 can be fully or partly implemented by an electronic control unit of the vehicle 100 (e.g., a vehicle control module (VCM), a domain controller, etc.). In other examples, some or all of the components of the controller 104 can be implemented by one or more other system(s) of the vehicle 100 (e.g., a brake control module (BCM), the anti-lock braking system (ABS), a powertrain controller, a transmission controller, an autonomous driving controller, etc.) and/or one or more external computers (e.g., a mobile device of a user, a system associated with the location of the vehicle 100, etc.). In some examples, the function of the controller 104 can be divided between several different systems of the vehicle 100 and/or external systems. The controller 104 is described in greater detail below in conjunction with FIG. 2. An example implementation of the controller 104 is described below in conjunction with FIG. 4.

The user interface 106 enables a user of the vehicle 100 to receive and input information with the systems of the vehicle 100. In some examples, the user interface 106 can be implemented by multiple components of the vehicle 100. For example, the user interface 106 can be implemented by a display of the vehicle 100 and/or a steering wheel of the vehicle 100. Additionally or alternatively, the user interface 106 can include one or more dash indicator(s), one or more button(s) on the dashboard or steering wheel, one or more speakers, one or more microphones, etc. In some examples, some or all of the user interface 106 can be implemented by a mobile device of the user (e.g., a mobile phone, a smartwatch, a tablet, etc.). An example implementation of the user interface 106 is described below in conjunction with FIG. 3.

The steering system 108 allows a user of the vehicle 100 to control/steer the vehicle 100. In the illustrated example of FIG. 1, the steering system 108 is a steer-by-wire system. In other examples, the steering system 108 can include a mechanical linkage between a user interface 106 (e.g., a steering wheel, etc.) and some or all of the wheels 102A, 102B, 102C, 102D of the vehicle 100 (e.g., via a steering column and rack and pinion system, etc.) (e.g., a conventional steering system, a partial steer-by-wire system, etc.). In some such examples, the steering system 108 can include a steering assist system (e.g., electric power steering (EPS), hydraulic power steering, electro-hydraulic power steering, etc.). In some examples, the steering system 108 can include a mechanism (e.g., an actuator disposed on the steering column, etc.) that allows an autonomous driving system of the vehicle 100 to steer the vehicle 100 without direct input from the user interface 106. While the steering system 108 is a four-wheeled steering system (e.g., each of the four wheels 102A, 102B, 102C, 102D is steered, etc.), the teachings of this disclosure can be applied to any type of steering system (e.g., a two-wheel steering system, etc.).

The cameras 110A, 110B capture data relating to the surroundings of the vehicle 100. The cameras 110A, 110B can be video cameras that generate continuous optical data regarding the surroundings of the vehicle 100 or photo cameras, which periodically capture images of the surroundings of the vehicle 100. For example, the front camera(s) 110A can include a dashboard camera, a front bumper camera, etc. For example, the rear camera(s) 110B can include a center high mounted stop level (CHMSL) camera(s) of the vehicle 100, a backup camera of the vehicle 100, etc. In other examples, the cameras 110A, 110B can be disposed at any other suitable location(s) of the vehicle 100. In some examples, one or both of the cameras 110A, 110B can be implemented by a mobile device of the vehicle 100.

The vehicle sensors 112 measure properties associated with the vehicle 100. In the illustrated example of FIG. 1, the vehicle sensors 112 include sensors that enable the identification and mapping of surrounding obstacles (e.g., radar, optical sensors, etc.). In other examples, the vehicle sensors 112 can include any suitable sensors (e.g., a grade sensor, temperature sensor, etc.). In some examples, the vehicle sensors 112 can be part of another system(s) of the vehicle 100 (e.g., a braking system of the vehicle 100, a parking system of the vehicle 100, etc.).

Figure 2:
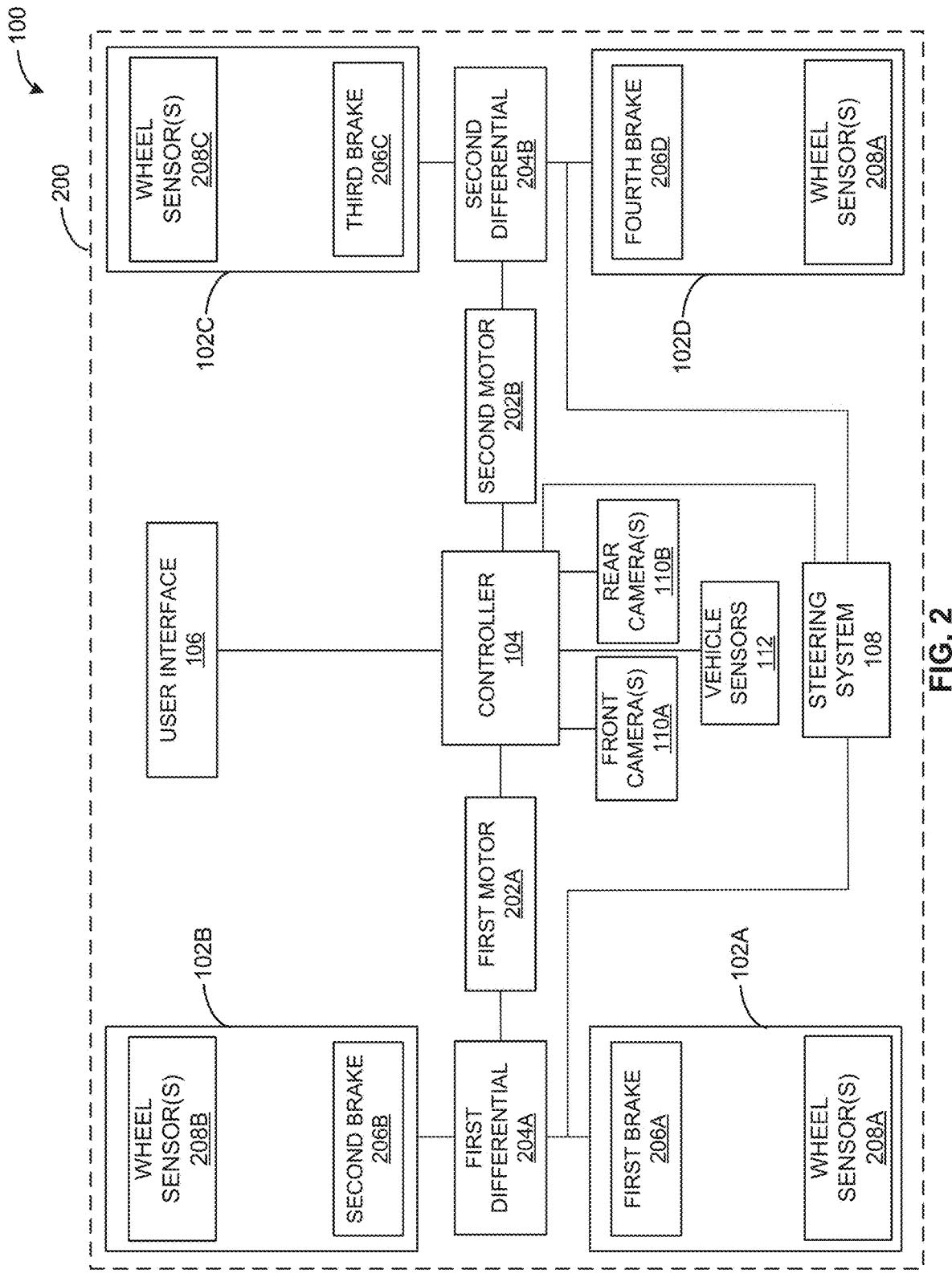
FIG. 2 is a system diagram of the vehicle of FIG. 1.

FIG. 2 is a diagram of an example system 200 of the vehicle 100 of FIG. 1. In the illustrated example of FIG. 2, the system 200 includes the example wheels 102A, 102B, 102C, 102D of FIG. 1, the controller 104 of FIG. 1, the user interface 106 of FIG. 1, the steering system 108 of FIG. 1, the example cameras 110A, 110B of FIG. 1 and the vehicle sensors 112 of FIG. 1. In the illustrated example of FIG. 2, the example system 200 includes an example first motor 202A, an example second motor 202B, an example first differential 204A, and an example second differential 204B. In the illustrated example of FIG. 2, the example first wheel 102A includes an example first brake 206A and example first wheel sensors 208A. In the illustrated example of FIG. 2, the example second wheel 102B includes an example second brake 206B and example second wheel sensors 208B. In the illustrated example of FIG. 2, the example third wheel 102C includes an example third brake 206C and example third wheel sensors 208C. In the illustrated example of FIG. 2, the example fourth wheel 102D includes an example fourth brake 206D and example fourth wheel sensors 208D.

The controller 104 can receive sensor data from the sensors 112, 208A, 208B, 208C, 208D and/or the cameras 110A, 110B. In some examples, the controller 104 can identify obstacles that surround the vehicle 100 based on received sensor data. In some examples, the controller 104 can access turn commands (e.g., submitted by a user via the user interface 106, etc.). In some examples, the controller 104 can determine the coefficient of friction of a driving surface of the vehicle 100 by selectively operating one or more of the motors 202A, 202B and/or the brakes 206A, 206B, 206C, 206D. In some such examples, the controller 104 can determine if a given turn command is executable by the vehicle 100 based on the determined coefficient(s) of friction and the identified obstacles around the vehicle 100. In some examples, the controller 104 can generate braking commands and motor commands to execute a given turn command. In some examples, the generated braking and motor commands can include fully braking one of the wheels 102A, 102B, 102C, 102D and operating a diagonally opposed one of the wheels 102A, 102B, 102C, 102D (e.g., fully braking the first wheel 102A and operating the third wheel 102C, fully braking the second wheel 102B and operating the fourth wheel 102D, fully braking the third wheel 102C and operating the first wheel 102A, fully braking the fourth wheel 102D and operating the third wheel 102C, etc.).

The first motor 202A rotates (e.g., operates, etc.) the first wheel 102A and the second wheel 102B via the first differential 204A. The second motor 202B rotates (e.g., operates, rotates, etc.) the first wheel 102A and the second wheel 102B via the second differential 204B. The motors 202A, 202B receive power from batteries (not illustrated) associated with the vehicle 100. While the motors 202A, 202B are described herein as electric motors, in other examples, the motors 202A, 202B can be any other suitable type of motor (e.g., combustion engines, hydrogen fuel cell engines, etc.). In the illustrated example of FIG. 2, the motors 202A, 202B receive user input (e.g., by depressing a throttle pedal, etc.) that trigger and/or regulate the output of the motors 202A, 202B.

The differentials 204A, 204B are gear trains that enable corresponding ones of the wheels 102A, 102B, 102C, 102D to rotate at different speeds. For example, the first differential 204A enables the first wheel 102A and the second wheel 102B to rotate at different speeds. Similarly, the second differential 204B enables the third wheel 102C and the fourth wheel 102D to rotate at different speeds. In the illustrated example of FIG. 2, the differentials 204A, 204B are coupled to the motors 202A, 202B (e.g., via rotating input shafts, etc.), respectively. In the illustrated example of FIG. 2, the differentials 204A, 204B are coupled to the corresponding ones of wheels 102A, 102B, 102C, 102D (e.g., via rotating output shafts, etc.).

The brakes 206A, 206B, 206C, 206D are mechanical components that retard the rotation of the wheels 102A, 102B, 102C, 102D. The brakes 206A, 206B, 206C, 206D activate in response to a user input (e.g., via the user interface 106, etc.). In some examples, each of the brakes 206A, 206B, 206C, 206D includes a caliper (not illustrated), which applies a clamping pressure to a corresponding rotor (not illustrated) fixedly coupled to a corresponding one of the wheels 102A, 102B, 102C, 102D, thereby slowing rotation of the corresponding one of the wheels 102A, 102B, 102C, 102D. While the brakes 206A, 206B, 206C, 206D are described herein as disc-brakes, the examples described herein can also be applied to any other suitable type of braking system (e.g., a drum brake system, a dual disc-drum brake system, a clasp brake system, band brake systems, electromagnetic brakes, etc.). Similarly, while the brakes 206A, 206B, 206C, 206D are described as functioning via a brake-by-wire system, the brakes 206A, 206B, 206C, 206D can communicate with the controller 104 by any other suitable means (e.g., hydraulic, electro-hydraulic, etc.).

The wheel sensors 208A, 208B, 208C, 208D are sensors associated with the respective ones of the wheels 102A, 102B, 102C, 102D to measure characteristics associated with the wheels 102A, 102B, 102C, 102D. For example, the wheel sensors 208A, 208B, 208C, 208D can measure the rotational speed and/or slippage of the wheels 102A, 102B, 102C, 102D. In some such examples, the wheel sensors 208A, 208B, 208C, 208D can include one or more tachometers, optical sensors, hall-effect sensors, etc. Additionally or alternatively, the wheel sensors 208A, 208B, 208C, 208D can include any other suitable sensors (e.g., temperature sensors, accelerometer, etc.).

During normal operation of the vehicle 100, operation of the steering system 108, the motors 202A, 202B, and the brakes 206A, 206B, 206C, 206D is controlled via the user interface 106 and the controller 104. For example, the controller 104 can receive user inputs (e.g., depression of a throttle pedal, depression of a brake pedal, etc.). In some examples, the controller 104 can interpret the user inputs and g cause the operation of the steering system 108, the motors 202A, 202B, and/or the brakes 206A, 206B, 206C, 206D. Additionally or alternatively, the user interface 106 can be directly mechanically coupled and cause operation of the steering system 108, the motors 202A, 202B, and/or the brakes 206A, 206B, 206C, 206D.

In some examples, a user of the vehicle 100 can change the mode of the system 200 to a confined space navigation mode (e.g., warehouse mode, etc.). For example, a user of the vehicle 100 can change the mode of the vehicle 100 via the user interface 106. In other examples, the controller 104 can cause the vehicle 100 to enter a confined space navigation mode automatically in response to a triggering event and/or condition (e.g., the vehicle 100 entering a confined space, detecting obstacles in the environment, etc.). In some such examples, while in the confined space navigation mode, the controller 104 and/or the steering system 108 can cause comparatively small slow inputs to the user interface 106 (e.g., a steering wheel, etc.) to yield finer than standard adjustment(s) to the steering wheels of the vehicle 100 (e.g., each of the wheels 102A, 102B, 102C, 102D in the illustrated example of FIG. 2, etc.). Similarly, while in confined space navigation mode, the controller 104 and/or the steering system 108 can cause comparatively rapid large inputs to the user interface 106 (e.g., a steering wheel, etc.) to yield greater than standard adjustment(s) to the steering wheels of the vehicle 100. As such, when the vehicle 100 is operating in confined space navigation mode, the vehicle 100 provides a user with better control over the vehicle 100 at slow speed and in confined spaces.

In some examples, the controller 104 can determine the coefficient of friction (COF) (μ) of the driving surface of the vehicle 100. For example, the controller 104 can fully brake the wheels 102A, 102B, 102C via the brakes 206A, 206B, 206C and then cause the activation of the second motor 202B. As such, because the wheels 102A, 102B, 102C cannot substantially rotate due to the engaged brakes 206A, 206B, 206C, the wheel 102D will not have traction and will slip as it rotates. The magnitude of slippage of the wheel 102D can be measured by the fourth wheel sensors 208D. Based on the magnitude of the slippage of the wheel 102D and the weight of the vehicle 100, the controller 104 can determine the coefficient of friction of the driving surface.

In some examples, the controller 104 can cause the vehicle 100 to execute a turn command using one or more turning techniques by executing one or more brake commands and/or motor commands. For example, the controller 104 can cause the vehicle 100 to pivot about one of the wheels 102A, 102B, 102C, 102D, as described below in conjunction with FIGS. 8A-9. In some examples, the controller 104 can partially engage each of the brakes 206A, 206B, 206C, 206D to control the speed of each of the wheels 102A, 102B, 102C, 102D, which is described below in conjunction with FIGS. 10A-11. In some examples, the controller 104 can cause the vehicle 100 to execute a tank turn which is described below in conjunction with FIGS. 12A-13.

Figure 3:
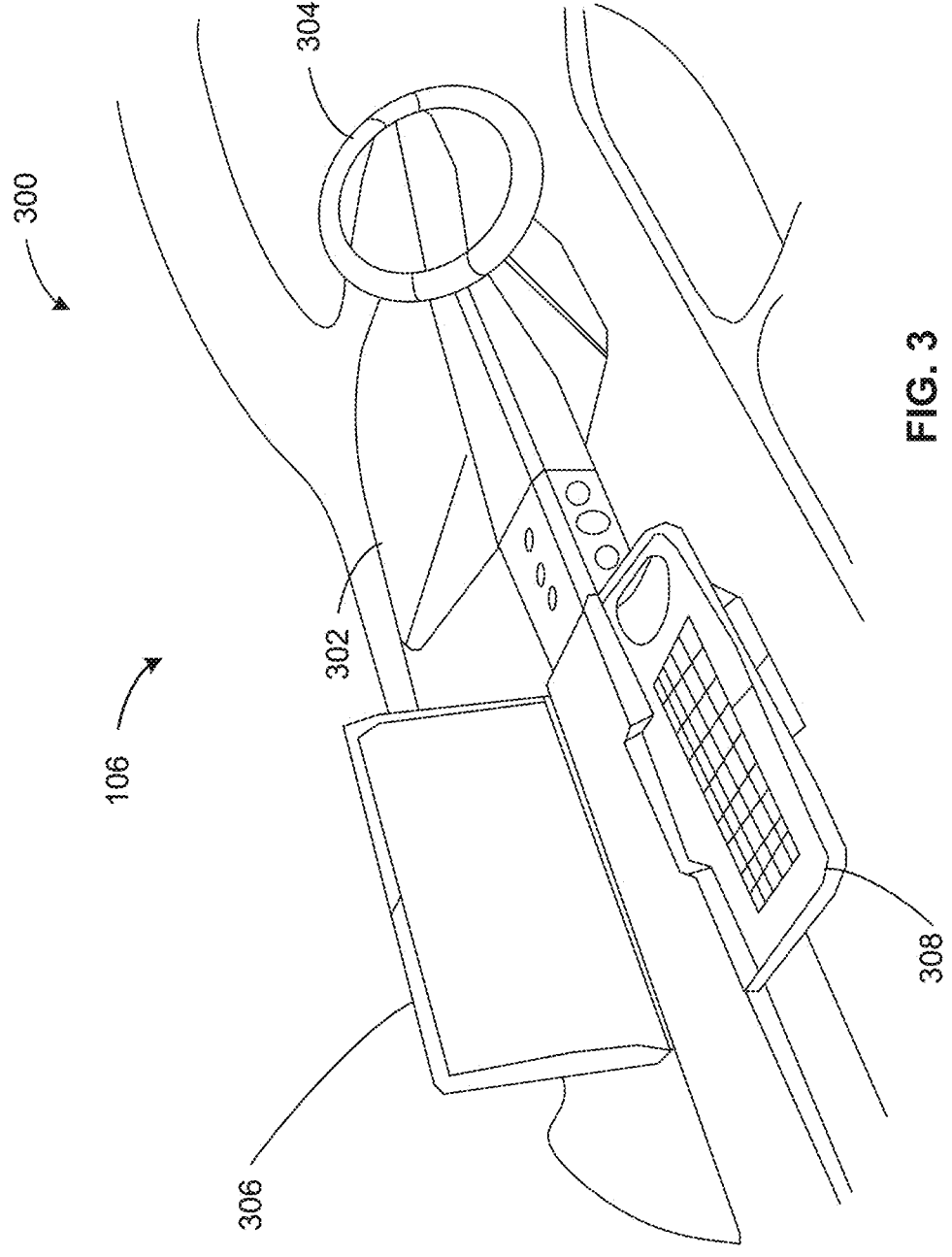
FIG. 3 is a perspective view of the user input of FIGS. 1 and 2.

FIG. 3 is a perspective view of the user interface 106 of FIGS. 1 and 2. In the illustrated example of FIG. 3, the user interface 106 is disposed (e.g., fully disposed, partially disposed, etc.) within an example cabin 300 of the vehicle 100. In the illustrated example of FIG. 3, the user interface 106 includes an example dashboard 302, an example steering wheel 304, an example display 306, and example console inputs 308.

The steering wheel 304 allows the user of the vehicle 100 to control the steering system of the vehicle 100 (e.g., the steering system 108 of FIG. 1, etc.). For example, the steering wheel 304 can be directly mechanically connected to the steered wheels of the vehicle 100. In other examples, the steering wheel 304 can be electronically connected to the driven wheels (e.g., the vehicle 100 is a steer-by-wire vehicle, etc.). In such examples, the controller 104 and/or a user of the vehicle 100 can modify the input sensitivity of the steering wheel 304. For example, a user of the vehicle 100 can change the driving mode of the vehicle 100 to a mode that enables better navigation in confined spaces (e.g., a confined space navigation mode, etc.). In some such examples, the controller 104 can cause comparatively smaller and slower rotations of the steering wheel 304 to yield finer than standard adjustment to the steered wheels of the vehicle 100 (e.g., each of the wheels 102A, 102B, 102C, 102D in the illustrated example of FIG. 2, etc.). Similarly, while in confined space navigation mode, the controller 104 can cause comparatively rapid large inputs to the steering wheel 304 (e.g., a steering wheel, etc.) to yield comparatively greater adjustments of the steered wheels of the vehicle 100.

The display 306 graphically presents information to a user of the vehicle 100. For example, the display 306 can present a graphical representation of an input turn command, a mapped environment with obstacles generated by the controller 104, and/or instructions for a user to execute a turn command and/or to modify the environment of the vehicle 100. For example, the display 306 can present a recommendation and/or instructions to modify the driving surface of the vehicle 100 on a visual representation of the environment of the vehicle 100 and/or the vehicle 100. In some examples, the display 306 can be a touch-screen and/or otherwise permit direct user inputs. In such examples, the display 306 can enable a user to input a turn command via the display 306 and/or the console inputs 308. In some such examples, a user of the vehicle 100 can input (e.g., trace, draw, etc.) a desired turn on the display 306, thereby allowing the controller 104 to generate a turn command from the user input.

Additionally or alternatively, the controller 104 can present and/or receive information from the console inputs 308 and/or other aspects of the user interface 106. For example, the user interface 106 can additionally include more indicators disposed on the dashboard 302 (e.g., dashboard light indicators, etc.), tactile feedback via the steering wheel 304, graphics presented via the display 306, audio indications from a speaker (not illustrated) of the vehicle 100, etc.

Figure 4:
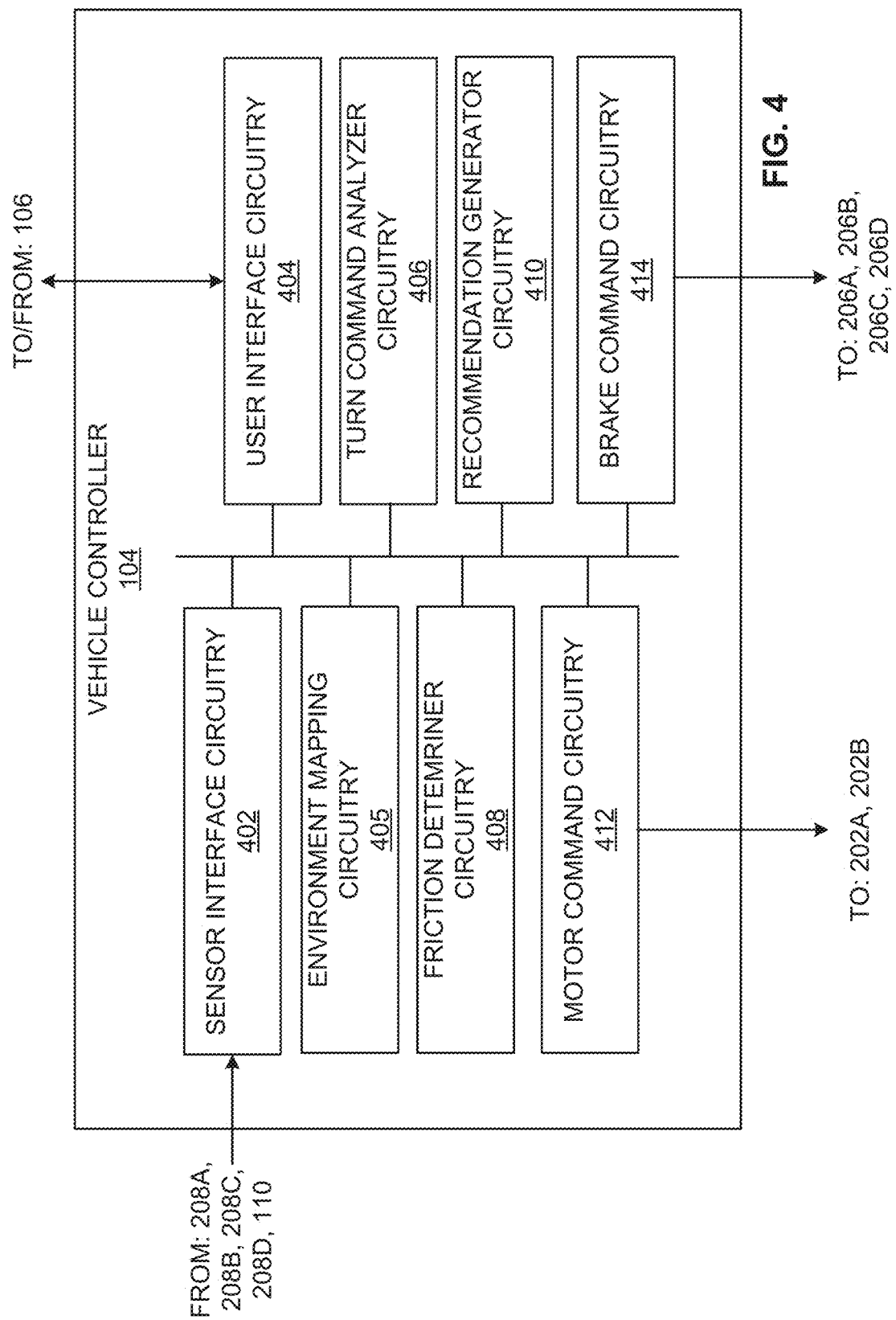
FIG. 4 is a block diagram of the controller of FIGS. 1 and 2.

FIG. 4 is a block diagram of the controller 104 of FIGS. 1 and 2. In the illustrated example of FIG. 4, the controller 104 includes example sensor interface circuitry 402, example user interface circuitry 404, example environment mapping circuitry 405, example turn command analyzer circuitry 406, example friction determiner circuitry 408, example recommendation generator circuitry 410, example motor command circuitry 412, and example brake command circuitry 414.

The sensor interface circuitry 402 receives sensor data from the sensors 112, 208A, 208B, 208C, 208D of the example vehicle 100. In some examples, the sensor interface circuitry 402 can transform the received sensor data from a machine-readable format (e.g., a voltage, a current, etc.) to a human-readable format (e.g., a string, a floating-point number, an integer, etc.).

The user interface circuitry 404 receives inputs from the user interface 106 of FIG. 1. For example, the user interface circuitry 404 can access (e.g., receive, etc.) turn commands input by a user of the vehicle 100. In some examples, the user interface circuitry 404 can receive user inputs to cause the activation of one or more of the brakes 206A, 206B, 206C, 206D (e.g., the depression of a brake pedal, the activation of a parking brake, etc.), the activation of one or more of the motors (e.g., the depression of a throttle pedal, etc.), the adjustment of the steering system (e.g., turning of the steering wheel 304 of FIG. 3, etc.). In some examples, the user interface circuitry 404 can cause the information, instructions, and recommendations generated by the recommendation generator circuitry 410 to be presented to a user of the vehicle 100. In some examples, the user interface circuitry 404 can present a representation of the environment generated by the environment mapping circuitry 405. Additionally or alternatively, the user interface circuitry 404 can send and/or receive data by any suitable means (e.g., audio, tactile feedback, etc.).

The environment mapping circuitry 405 can identify obstacles around the vehicle 100 to create a map of the environment of the vehicle 100. For example, the environment mapping circuitry 405 can access data from the cameras 110A, 110B, and/or the vehicle sensors 112. In some examples, the environment mapping circuitry 405 determine potential obstacles around the vehicle 100 and/or clear paths along which the vehicle 100 may operate. In some examples, the environment mapping circuitry 405 can interface with external systems (e.g., sensors associated with the driving environment, etc.) to identify obstacles in the environment. In some examples, while the vehicle 100 is executing a turn, the environment mapping circuitry 405 can identify potential collisions with obstacles in the environment of the vehicle 100.

The turn command analyzer circuitry 406 analyzes the turn commands accessed by the user interface circuitry 404. For example, the turn command analyzer circuitry 406 can determine a starting position of the vehicle 100 (e.g., a first position, a current position, etc.) and a desired end position of the vehicle 100 (e.g., a second position, etc.) based on the turn command. In some examples, the turn command analyzer circuitry 406 can determine if the turn command is executable by the vehicle 100 based on properties of the vehicle 100 (e.g., geometric properties of the vehicle, etc.), the frictional coefficient of the driving surface of the vehicle 100 (e.g., as determined by the frictional determiner circuitry 408, etc.), and the obstacles in the environment of the vehicle 100 (e.g., as determined by the environment mapping circuitry 405, etc.). In some examples, after determining a turn is executable by the vehicle 100, the turn command analyzer circuitry 406 can cause the motor command circuitry 412 and/or the brake command circuitry 414 to generate motor commands and brake commands, respectively, to execute the turn command.

The friction determiner circuitry 408 can determine the friction of the driving surface based on data received from the sensor interface circuitry 402. For example, the motor command circuitry 412 and the brake command circuitry 414 can cause one wheel to rotate (e.g., the first wheel 102A, etc.), while the other wheels are fully braked (e.g., the wheels 102B, 102C, 102D, etc.). In such examples, based on the detected rotation of the wheel 102A (e.g., the slippage of the first wheel 102A, etc.) and the weight of the vehicle 100, the friction determiner circuitry 408 can determine the frictional coefficient of the driving surface of the vehicle 100.

The recommendation generator circuitry 410 generates recommendations for a user of the vehicle 100. For example, the recommendation generator circuitry 410, in response to determining a turn command is not executable by the vehicle 100, can issue a recommendation and/or instruction to a user of the vehicle 100 to change the coefficient of friction of the driving surface of the vehicle 100. For example, the recommendation generator circuitry 410 can generate a recommendation to decrease the coefficient of friction of unbraked and/or undriven wheels (e.g., by placing down a low friction mat, etc.). In such examples, decreasing the coefficient of friction on unbraked and undriven wheels can improve the turning radius of the vehicle 100 by 30%. Additionally or alternatively, the recommendation generator circuitry 410 can generate a recommendation to increase the coefficient of friction of braked and/or driven wheels of the vehicle 100 (e.g., by placing down a high friction mat, etc.). Similarly, the recommendation generator circuitry 410 can also issue a recommendation to otherwise inhibit the rotation of fully braked wheels (e.g., moving the wheel into a hole, placing the wheel in wheel blocks, etc.) about the lateral axis of the vehicle 100.

The motor command circuitry 412 generates motor commands that cause the activation and/or operation of the motors of the vehicle 100 (e.g., the motors 202A, 202B of FIG. 2, etc.). In some examples, the motor command circuitry 412 can generate motor commands in conjunction with brake command circuitry 314 to execute a turn command accessed by the user interface circuitry 404. In some examples, the motor command circuitry 412 can cause the operation of one or more of the motors 202A, 202B in a particular direction (e.g., forward, reverse, etc.) and/or at a particular output torque.

The brake command circuitry 414 generates brake commands that cause the activation of the brakes of the vehicle 100 (e.g., the brakes 206A, 206B, 206C, 206D of FIG. 2, etc.). In some examples, the brake command circuitry 412 can generate brake commands in conjunction with the motor command circuitry 412 generating motor commands to execute a turn command accessed by the user interface circuitry 404. In some examples, the brake command circuitry 414 can generate commands to cause one or more of the brakes 206A, 206B, 206C, 206D to be fully or partially braked. In some examples, the brake command circuitry 414 can generate commands to cause one or more of the brakes 206A, 206B, 206C, 206D to be disengaged from the corresponding ones of the wheels 102A, 102B, 102C, 102D, etc.

While an example manner of implementing the controller 104 of FIGS. 1 and 2 is illustrated in FIG. 4, one or more of the elements, processes, and/or devices illustrated in FIG. 4 may be combined, divided, re-arranged, omitted, eliminated, and/or implemented in any other way. Further, the example sensor interface circuitry 402, the example user interface circuitry 404, the example environment mapping circuitry 405, the example turn command analyzer circuitry 406, the example friction determiner circuitry 408, the example recommendation generator circuitry 410, example motor command circuitry 412, the example brake command circuitry 314 and/or, more generally, the example controller 104 of FIG. 4, may be implemented by hardware, software, firmware, and/or any combination of hardware, software, and/or firmware. Thus, for example, any of the example sensor interface circuitry 402, the example user interface circuitry 404, the example environment mapping circuitry 405, the example turn command analyzer circuitry 406, the example friction determiner circuitry 408, the example recommendation generator circuitry 410, example motor command circuitry 412, the example brake command circuitry 314, and/or, more generally, the example controller 104 of FIG. 4, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example sensor interface circuitry 402, the example user interface circuitry 404, the example environment mapping circuitry 405, the example turn command analyzer circuitry 406, the example friction determiner circuitry 408, the example recommendation generator circuitry 410, example motor command circuitry 412, the example brake command circuitry 314 is/are hereby expressly defined to include a non-transitory computer readable storage device or storage disk such as a memory, a digital versatile disk (DVD), a compact disk (CD), a Blu-ray disk, etc., including the software and/or firmware. Further still, the example controller 104 of FIGS. 1 and 2 may include one or more elements, processes, and/or devices in addition to, or instead of, those illustrated in FIG. 4, and/or may include more than one of any or all of the illustrated elements, processes and devices.

Figures 5A, 5B:
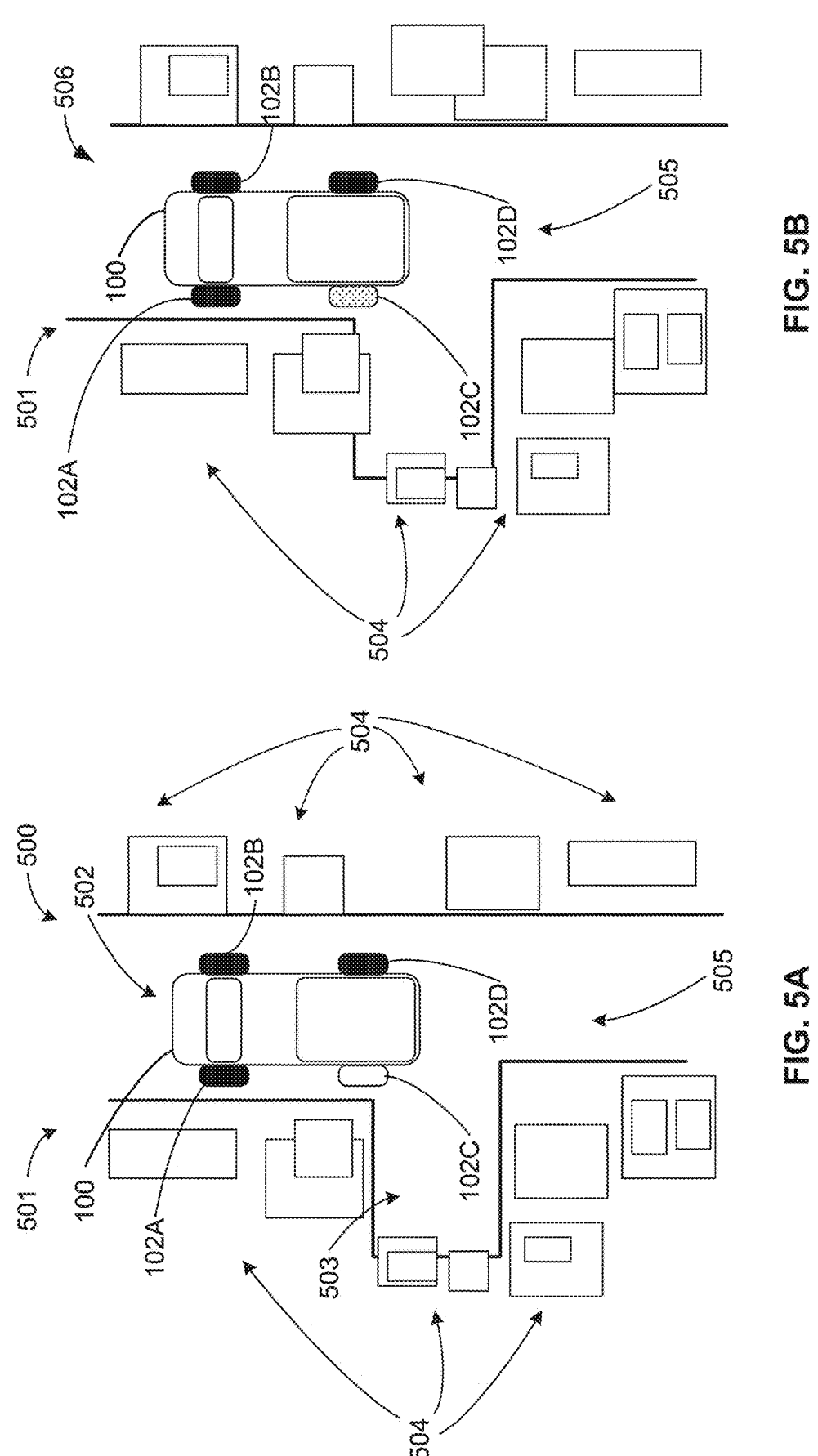
FIGS. 5A-5D are simplified illustrations of the vehicle of FIG. 1 determining a frictional coefficient of a driving surface and related actions.

FIG. 5A is a simplified illustration of the vehicle 100 of FIG. 1 in a first example condition 500 prior to executing a turn command in an example environment 501. In the illustrated example of FIG. 5A, the vehicle 100 is in an example position 502 and a turn command is to move the vehicle 100 to an example second position 503. In the illustrated example of FIGS. 5A-5D, the environment 501 includes example obstacles 504 and an example driving surface 505. The first condition 500 includes the controller 104 issuing a brake command to fully brake the wheels 102A, 102B, 102D, which prevents the rotation of the wheels 102A, 102B, 102D while the coefficient of friction of the driving surface is determined. In the illustrated example of FIG. 5A, the controller 104 of the vehicle 100 can map the environment 501 to identify the obstacles 504 (e.g., via the vehicle sensors 112, via the cameras 110A, 110B, etc.).

FIG. 5B is a simplified illustration of the vehicle 100 of FIG. 1 in an example second condition 506 prior to executing a turn command in an example environment 501. In the illustrated example of FIG. 5B, the controller 104 issues a motor command to cause the torque to be delivered to the unbraked wheel 102C and measure the resulting wheel slippage. In such examples, the controller 104 can determine the coefficient of friction of the driving surface 505. In such examples, the controller 104 can determine a minimum turning radius of the vehicle 100 based on the determined coefficient of friction.

Figures 5C, 5D:
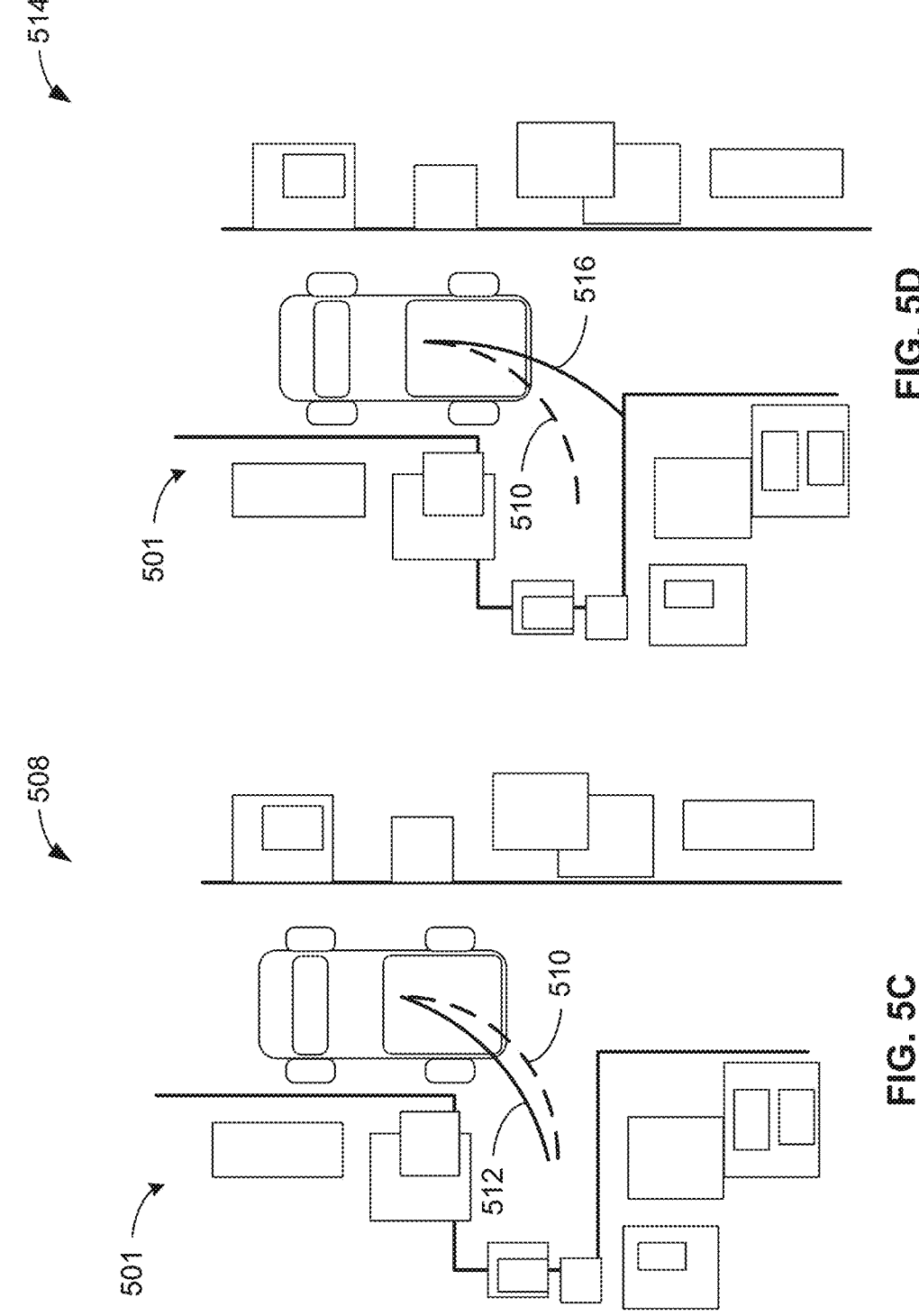

FIG. 5C is a simplified illustration of the vehicle 100 of FIG. 1 in a third example third condition 508 after determining the coefficient of friction. The controller 104 can determine an example required turning radius 510 to execute the turn command. In such examples, the controller 104 can determine the required turning radius 510 based on the properties of the vehicle 100 (e.g., the geometry/dimensions of the vehicle 100, the weight of vehicle 100, etc.). In the illustrated example of FIG. 5C, the controller 104 has determined that the required radius 510 is greater than or equal to an example minimum turning radius 512 of the vehicle 100. That is, the controller 104 determines the vehicle 100 is able to execute the turn command without colliding with any objects in the environment 501. The controller 104 issues brake commands and motor commands to cause the vehicle 100 to execute the turn command. Particularly, the controller 104 can generate brake commands and/or motor commands that cause the vehicle 100 to move from the first position 502 to the second position 503.

FIG. 5D is simplified illustration of the vehicle 100 of FIG. 1 in an example fourth condition 516 prior to executing a turn command in the example environment 501. In the illustrated example of FIG. 5D, the controller 104 has determine that the required turning radius 510 is less than an example second minimum turning radius 514 of the vehicle 100. That is, the vehicle 100 cannot execute the turn command due to the potential of colliding with one or more of the obstacle(s) 504 of the environment 501. In some such examples, the controller 104 can issue a notification and/or recommendation (e.g., via the user interface 106, etc.) to a user of the vehicle 100 to modify the environment 501 to make the turn command executable. An example of a condition where changing the environment 501 would make the turn executable is described below in conjunction with FIGS. 6A and 6B.

Figures 6A, 6B:
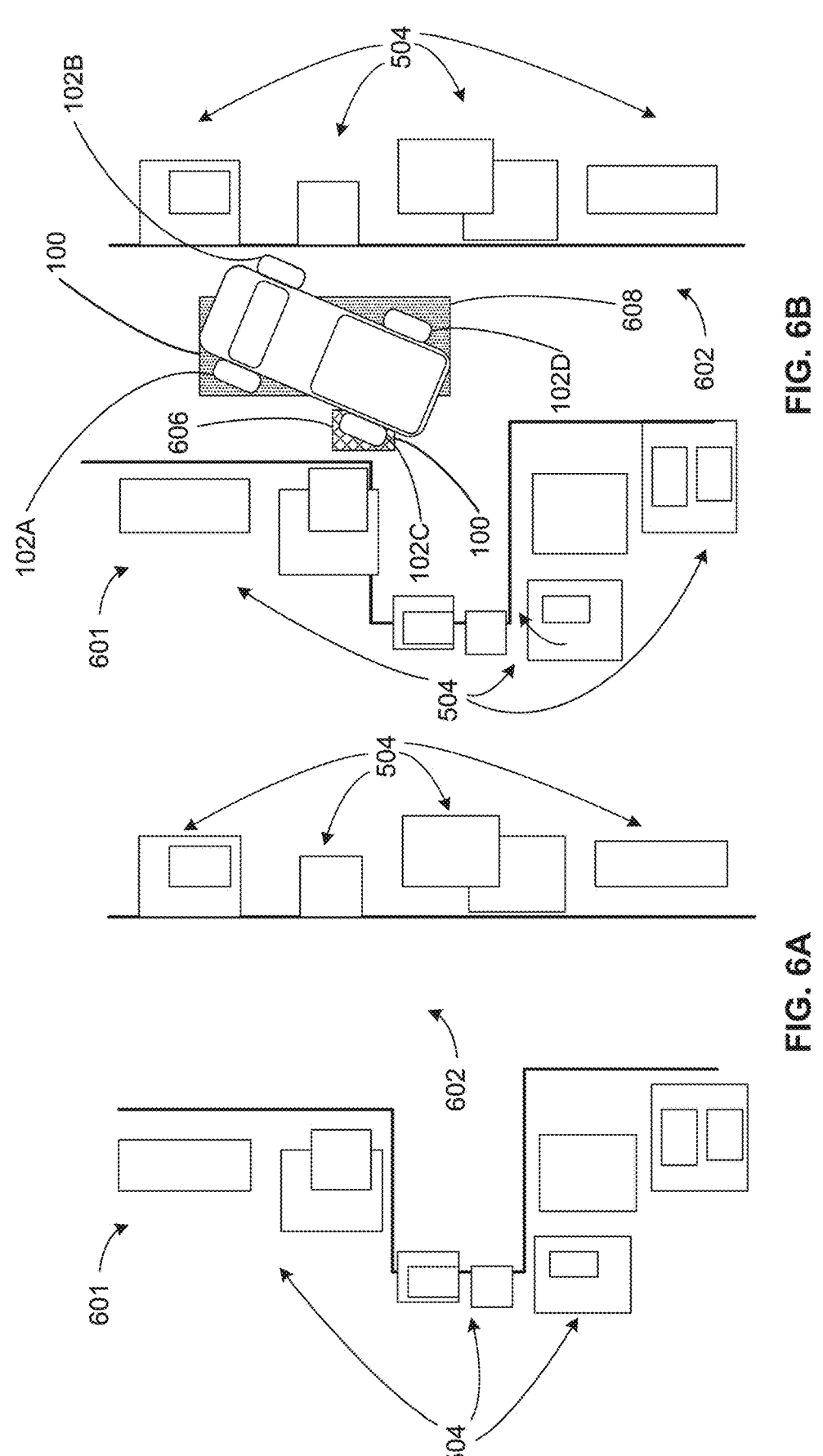
FIGS. 6A-6B are simplified illustrations of the vehicle of FIG. 1 before and after the friction of the driving surface has been modified.

FIG. 6A is a simplified illustration of an example environment 601 including an example surface 602. In the illustrated example of FIG. 6A, the modified surface 602 is not conducive to turns with comparatively low turning radii. In such examples, if a vehicle determines the coefficient of friction of the surface 602 does not permit an input turn command of a vehicle (e.g., the vehicle 100, etc.), the vehicle can issue a recommendation to a user of the vehicle to modify the coefficient of friction of the modified surface 602. In other examples, the vehicle 100 can issue a recommendation for the obstacles 504 to be rearranged to allow larger turns, if possible. For example, the vehicle 100 can issue a notification to move one or more of the obstacles 504 out of the potential path of the vehicle 100.

FIG. 6B is a simplified illustration of the example environment 601 including the example surface 602 with an example first modified surface 606 and an example second modified surface 608. In the illustrated example of FIG. 6B, a user of the vehicle 100 has placed the first modified surface 606 under the third wheel 102C of the vehicle 100 and the second modified surface 608 under the first wheel 102A and the fourth wheel 102D. In the illustrated example of FIG. 6B, the modified surfaces 606, 608 improve the turning radius of the vehicle 100.

In the illustrated example of FIG. 6B, the first modified surface 606 is a low friction surface (e.g., lubricating portions of the modified surface 602, a plastic mat, a polycarbonate mat, a polytetrafluoroethylene mat, etc.) placed under the third wheel 102C. In FIG. 6B, the wheel 102C is a braked wheel. As such, enabling the free rotation about the vertical axis of the wheel 102C decreases the turning radius of the vehicle 100. In some examples, the first modified surface 606 can be absent. In such examples, a user can instead place wheel blocks under the wheel 102C. In other examples, the modified surface 602 can include a hole or depression in which the wheel 102C is disposed to similarly inhibit the rotation of the wheel 102C about the lateral axis of the vehicle 100 but allow pivoting about the vertical axis of the vehicle 100. In the illustrated example of FIG. 6B, the second modified surface 608 is a low friction surface (e.g., lubricating portions of the modified surface 602, a plastic mat, a polycarbonate mat, a polytetrafluoroethylene mat, etc.). In FIG. 6B, the wheels 102A, 102D are undriven and unbraked wheels. In the illustrated example of FIG. 6B, the lower coefficient of friction of the second modified surface 608 allows the wheels 102A, 102D to more easily slide over the second modified surface 608. As such, allowing the wheels 102A, 102D to freely move over the first modified surface 606 decreases the turning radius of the vehicle 100. In other examples, modifying the surface 602 to have a greater frictional coefficient (e.g., underneath the driven wheel 102B) can additionally improve the turning radius. In some such examples, the vehicle 100 can recommend a user of the vehicle 100 to place a high friction surface (e.g., a rubber mat, a fiber mat, depositing chalk, depositing sand, etc.) under one or more of the wheels 102A, 102B, 102C, 102D.

Flowcharts representative of example hardware logic circuitry, machine readable instructions, hardware implemented state machines, and/or any combination thereof for implementing the controller 104 of FIGS. 1 and 3 are shown in FIGS. 7, 9, 11, and 13. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 7, 9, 11, and 13, many other methods of implementing the example controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operation that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7, 9, 11, and 13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

Figure 7:
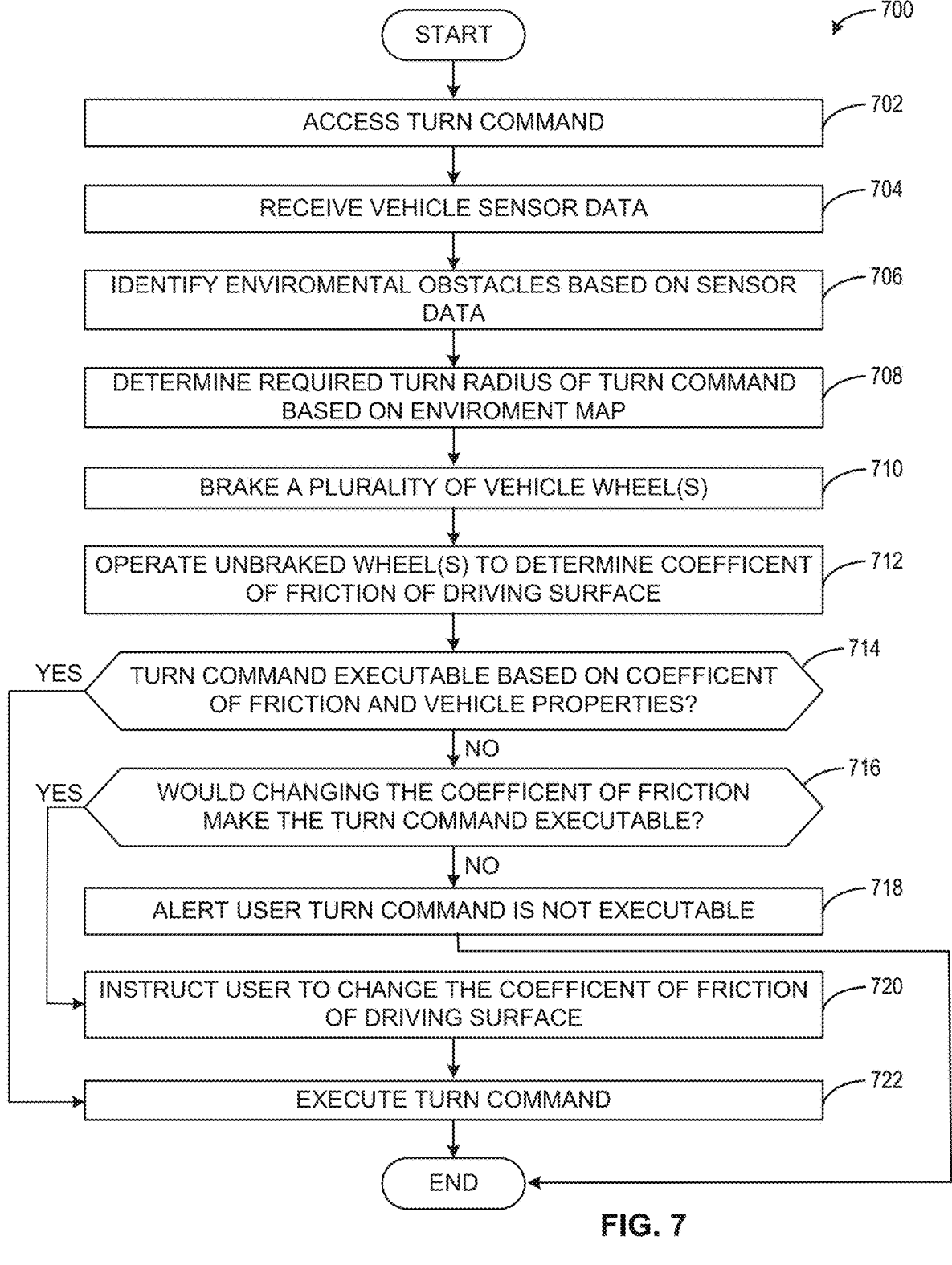
FIG. 7 is a flowchart representative of example machine readable instructions that may be executed by example processor circuitry to implement the controller of FIG. 2 to execute the turn(s) illustrated in FIGS. 5A-6B.

FIG. 7 is a flowchart representative of example machine readable instructions and/or example operations 700 that may be executed by example processor circuitry to implement the controller 104 of FIG. 2 to execute the turn(s) illustrated in FIGS. 5A-6B. The operations 700 begins at block 702. At block 702, the user interface circuitry 404 accesses a turn command. For example, the user interface circuitry 404 can access a turn command input by a user of the vehicle 100 (e.g., via the user interface 106, etc.). In some examples, the user interface circuitry 404 can access a turn command generated by an autonomous driving module of the vehicle 100.

At block 704, the sensor interface circuitry 402 accesses vehicle sensor data. For example, the sensor interface circuitry 402 can retrieve data from the sensors 112, 208A, 208B, 208C, 208D and/or other sensors associated with the vehicle 100. In some examples, the sensor interface circuitry 402 can transform the received data from a machine-readable format (e.g., a voltage value, a current value, etc.) into a human-readable format (e.g., a string, a floating-point number, an integer, etc.).

At block 706, the environment mapping circuitry 405 identifies environmental obstacles based on the accessed sensor data. For example, the environment mapping circuitry 405 can identify obstacles (e.g., the obstacles 504 of FIG. 5, etc.) around the vehicle 100 to create a map of the environment (e.g., the environment 501, etc.) of the vehicle 100. For example, the environment mapping circuitry 405 can access data from the cameras 110A, 110B, and/or the vehicle sensors 112. In some examples, the environment mapping circuitry 405 can determine potential obstacles around the vehicle 100 and/or clear paths for the vehicle 100 to operate. In some examples, the environment mapping circuitry 405 can interface with external systems (e.g., sensors associated with the environment 501, etc.) to identify the obstacle in the environment.

At block 708, the turn command analyzer circuitry 406 determines the required turning radius based on the environmental map. For example, the turn command analyzer circuitry 406 can, based on an output of the environment mapping circuitry 405, determine the required turning radius associated with the accessed turn command. In some examples, the turn command analyzer circuitry 406 can determine the required turning radius based on the identified obstacles, other features of the environment 501, the current position of the vehicle 100, and/or the requested end position of the vehicle 100. In other examples, the turn command analyzer circuitry 406 can determine the required turning radius based on any other suitable criteria.

At block 710, the brake command circuitry 414 brakes a plurality of the brakes 206A, 206B, 206C, 206D of the vehicle 100. For example, the brake command circuitry 414 can operate three of the brakes 206A, 206B, 206C, 206D of the vehicle 100. In some such examples, the brake command circuitry 414 can cause the first brake 206A, the second brake 206B, and the fourth brake 206D to fully brake corresponding ones of the wheels 102A, 102B, 102D. In other examples, the brake command circuitry 414 can cause any suitable combination of the brakes 206A, 206B, 206C, 206D to be operated.

At block 712, the friction determiner circuitry 408 and/or the motor command circuitry 412 operates the unbraked wheel(s) of the vehicle 100 to determine the coefficient of friction of the driving surface 505. For example, if the wheels 102A, 102B, 102C are fully braked and the third wheel 102C is unbraked, the motor command circuitry 412 can cause the motor 202A to apply power to the first axle 103A. In some such examples, the friction determiner circuitry 408 can determine the friction of the driving surface 505 based on data received from the sensor interface circuitry 402. In such examples, based on the detected rotation of the wheel 102A (e.g., the slippage of the first wheel 102A, etc.) and the weight of the vehicle 100, the friction determiner circuitry 408 can determine the frictional coefficient of the driving surface 505. Additionally or alternatively, the friction determiner circuitry 408 can determine the frictional coefficient of the driving surface 505 based on any other suitable criteria.

At block 714, the turn command analyzer circuitry 406 determines if the turn command is executable based on the coefficient of friction and properties of the vehicle 100. For example, the turn command analyzer circuitry 406 can determine a minimum required turning radius based on the coefficient of friction and properties of the vehicle 100. In some such examples, the turn command analyzer circuitry 406 can compare the determined minimum turning radius with the required turning radius to determine if the accessed turn command is executable. In other examples, the turn command analyzer circuitry 406 can determine if the accessed turn command is executable by any other suitable means. If the turn command analyzer circuitry 406 determines the turn command is executable, the operations 700 advances to block 722. If the turn command analyzer circuitry 406 determines the turn command is not currently executable, the operations 700 advances to block 716.

At block 716, the turn command analyzer circuitry 406 determines if changing the coefficient of friction would make the turn command executable. For example, the turn command analyzer circuitry 406 can modify a value associated with the coefficient of friction (e.g., a value associated with the coefficient of friction stored in a memory of the vehicle 100, etc.) and repeat the analysis performed during the execution of block 714. In some such examples, the turn command analyzer circuitry 406 can compare the new minimum turning radius (e.g., calculated using modified coefficient of friction values, etc.) to the required turning radius. In some examples, the modified coefficient of friction is associated with an ability of a user to change the coefficient of friction. For example, if the user has access to a comparatively high friction surface (e.g., a rubber mat, etc.) and/or a comparatively low friction surface (e.g., a plastic mat, etc.). The turn command analyzer circuitry 406 can recalculate the minimum turning radius based on the coefficients associated with the surfaces to which the user has access. If turn command analyzer circuitry 406 determines changing the coefficient of friction would make the turn command executable, the operations 700 advances to block 720. If turn command analyzer circuitry 406 determines changing the coefficient of friction would make the turn command executable, the operations 700 advances to block 720.

At block 718, the recommendation generator circuitry 410 alerts a user of the vehicle 100 that the turn command is not executable. For example, the recommendation generator circuitry 410 can alert a user of the vehicle 100 via the user interface circuitry 404. In such examples, the recommendation generator circuitry 410 can cause an alert to be presented to a user of the vehicle 100 via the display 306 and/or another component of the user interface 106. Additionally or alternatively, the recommendation generator circuitry 410 can alert the user that an accessed turn command is not executable by other suitable means (e.g., presenting an alert to a mobile device of the user, presenting an alert via another computer system, etc.

At block 720, the recommendation generator circuitry 410 instructs the user to change the coefficient of friction. For example, the recommendation generator circuitry 410 can present a recommendation to increase the coefficient of friction associated with a braked wheel of the vehicle 100 (e.g., the third wheel 102C in FIG. 6B, etc.). Additionally or alternatively, the recommendation generator circuitry 410 can present a recommendation to decrease the coefficient of friction associated with unbraked wheels of the vehicle 100 (e.g., the first wheel 102A and the third wheel 102C of FIG. 6B, etc.). In other examples, the recommendation generator circuitry 410 can present any other suitable recommendation. In some examples, the recommendation generator circuitry 410 can alert a user of the vehicle 100 to change the coefficient of friction of the driving surface via the user interface circuitry 404. In such examples, the recommendation generator circuitry 410 can cause a recommendation to be presented to a user of the vehicle 100 via the display 306 of FIG. 3 and/or another component of the user interface 106. Additionally or alternatively, the recommendation generator circuitry 410 can presentation a recommendation to the user by other suitable means (e.g., presenting an alert to a mobile device of the user, presenting an alert via another computer system, etc.).

At block 722, the motor command circuitry 412 and/or the brake command circuitry 414 executes the turn command. For example, the motor command circuitry 412 can operate one or more of the motors 202A, 202B of FIG. 2 and/or the brake command circuitry 414 can brake (e.g., fully brake, partially brake, etc.) one of more the brakes 206A, 206B, 206C, 206D of FIG. 2. Example techniques that may be employed during the execution of block 722 to execute turns in confined driving environments are discussed in conjunction with FIGS. 8A-13. In other examples, the motor command circuitry 412 and/or the brake command circuitry 414 can execute the turn command by any other suitable means.

Figures 8A, 8B, 8C:
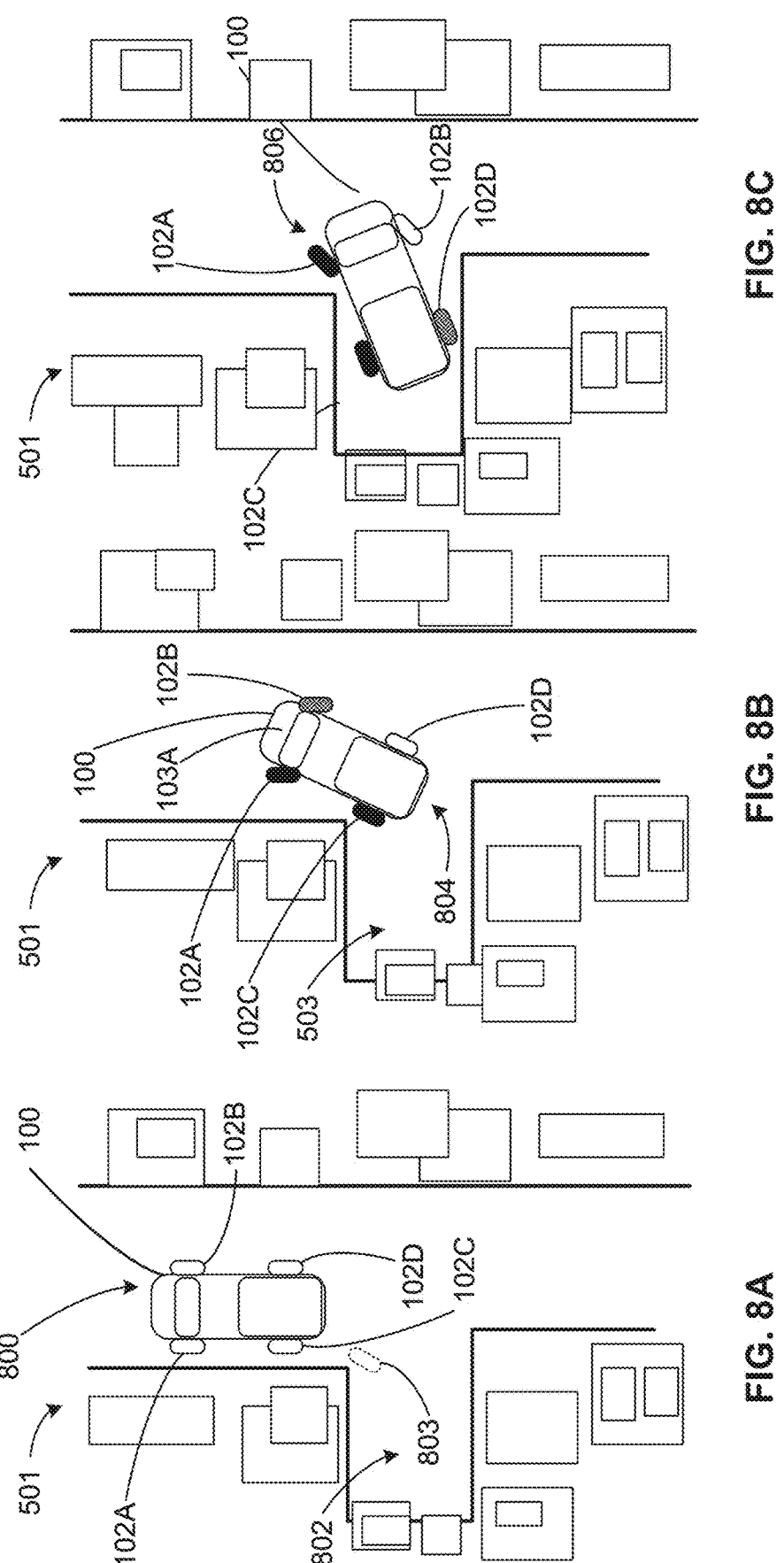
FIGS. 8A-8C are simplified illustrations of the vehicle of FIG. 1 executing a turn via a first turning method.

FIG. 8A is a simplified illustration of the vehicle 100 of FIG. 1 at an example first location 800 in the example environment 501 of FIGS. 5A-6B. In the illustrated example of FIG. 8A, the vehicle 100 has been set to execute a turn command to move the vehicle 100 to an example second position 802. In the illustrated example of FIGS. 8A-8C, the vehicle 100 will execute the turn command via a pivot turning technique (e.g., a first turning technique, etc.). In the illustrated example of FIG. 8A, the vehicle 100 executes one or more brake commands and/or motor commands to move the third wheel 102C to an example pivot position 803.

FIG. 8B is a simplified illustration of the vehicle 100 of FIG. 1 at an example third location 804 in the example environment 501 of FIGS. 5A-6B after executing the motor command and/or the brake command described above in conjunction with FIG. 8A. The third location 804 (e.g., a first intermediate position, etc.) is a position between the first position 800 and the second position 802. In the illustrated example of FIG. 8B, the vehicle 100 has executes brake commands and motor commands to pivot about the third wheel 102C by applying a torque to the second wheel 102B.

In the illustrated example of FIG. 8B, the vehicle 100 executes a brake command to fully brake the third wheel 102C. In the illustrated example of FIG. 8B, the vehicle 100 executes the turn command by executing a brake command to fully brake the third wheel 102C (e.g., the pivot wheel, etc.) and executing a motor command to apply torque to the second wheel 102B (e.g., the diagonally opposed drive wheel, etc.). For example, to provide power to the second wheel 102B, the vehicle 100 can fully brake the first wheel 102A and apply power to the first axle 103A via the first motor 202A (not illustrated). In such examples, because the first wheel 102A is fully braked, the differential 204A (not illustrated) of the first axle causes the power provided by the first motor 202A to be transferred to the second wheel 102B. As a result of the brake command and the motor command, the vehicle 100 begins to pivot (e.g., rotate, etc.) about the third wheel 102C.

FIG. 8C is a simplified illustration of the vehicle 100 of FIG. 1 at an example fourth location 806 in the example environment 501 of FIGS. 5A-6B after executing the motor command and the brake command illustrated in FIGS. 8A and 8B. The third location 806 (e.g., a second intermediate position, etc.) is a position between the first position 800 and the second position 802. In the illustrated example of FIG. 8C, the vehicle 100 has completed the motor command and brake command associated with FIGS. 8A and 8B. To complete the turn command, the vehicle 100 executes another brake command and motor command to pivot about the first wheel 102A.

In the illustrated example of FIG. 8C, the vehicle 100 continues to execute the turn command by executing a brake command to fully brake the first wheel 102A (e.g., the pivot wheel, etc.) and executing a motor command to apply to torque to the fourth wheel 102D (e.g., the drive wheel, etc.), which is the diagonally opposed wheel. For example, to provide power to the fourth wheel 102D, the vehicle 100 can fully brake the first wheel 102A and apply power to the second axle 103B (not illustrated) via the second motor 202B (not illustrated). In such examples, because the first wheel 102A is fully braked, the differential 204A (not illustrated) of the first axle causes the power provided by the first motor 202A to be transferred to the second wheel 102B. As a result of the brake command and the motor command, the vehicle 100 of FIG. 8B, begins to pivot (e.g., rotate, etc.) about the first wheel 102A. After executing the second motor command and the second brake command, the vehicle 100 reaches the second position 802.

Figure 9:
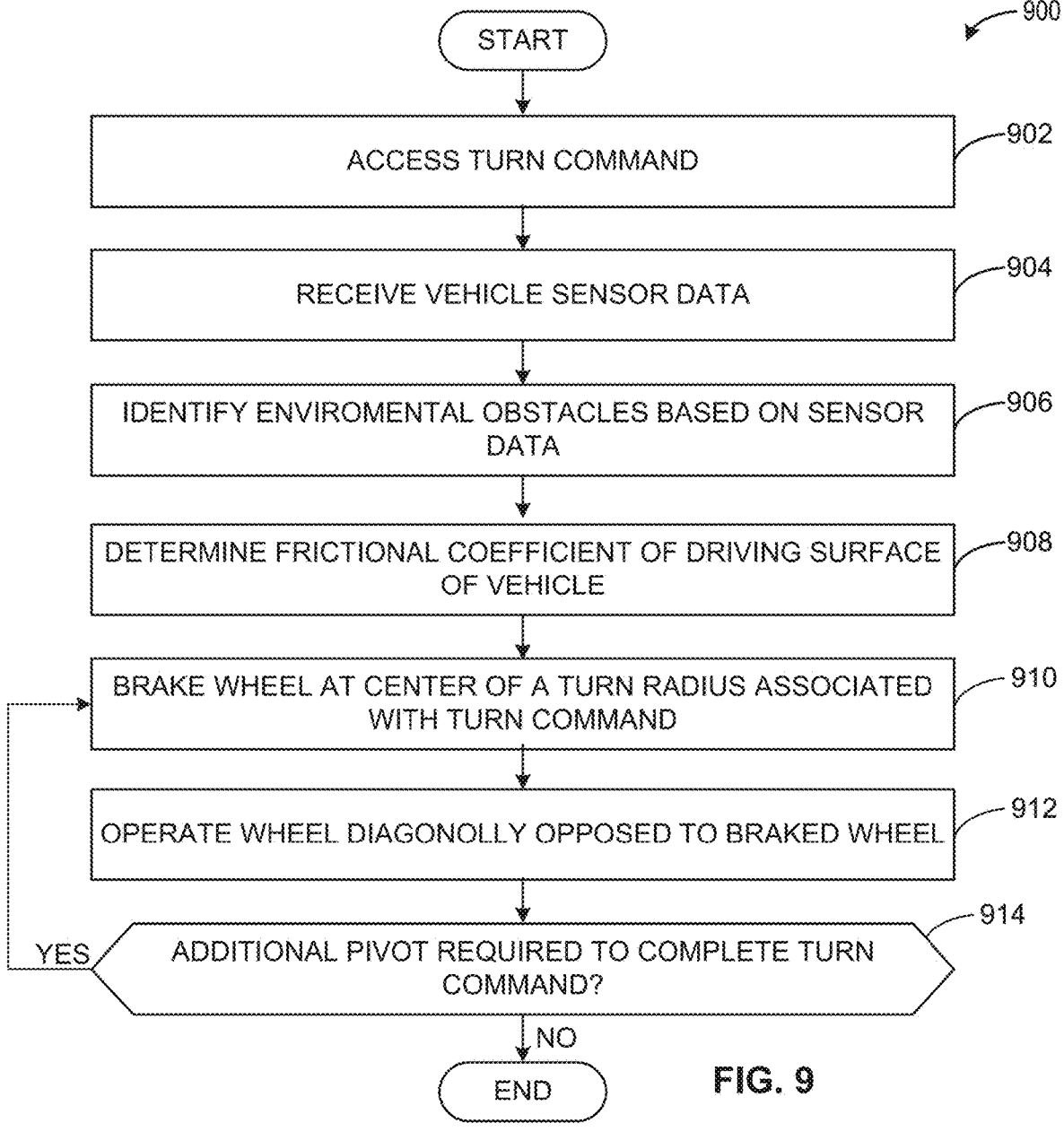
FIG. 9 is a flowchart representative of example machine readable instructions that may be executed by example processor circuitry to implement the controller of FIG. 2 to execute the turn(s) illustrated in FIGS. 8A-8C.

FIG. 9 is a flowchart representative of example machine readable instructions and/or example operations 900 that may be executed by example processor circuitry to implement the controller 104 of FIG. 2 to execute the turn(s) illustrated in FIGS. 8A-8C. The operations 900 begins at block 902. At block 902, the user interface circuitry 404 accesses a turn command. For example, the user interface circuitry 404 can access a turn command input by a user of the vehicle 100 (e.g., via the user interface 106, etc.). In some examples, the user interface circuitry 404 can access a turn command generated by an autonomous driving module of the vehicle 100.

At block 904, the sensor interface circuitry 402 accesses vehicle sensor data. For example, the sensor interface circuitry 402 can retrieve data from the sensors 112, 208A, 208B, 208C, 208D and/or other sensors associated with the vehicle 100. In some examples, the sensor interface circuitry 402 can transform the received data from a machine-readable format (e.g., a voltage value, a current value, etc.) into a human-readable format (e.g., a string, a floating-point number, an integer, etc.).

At block 906, the environment mapping circuitry 405 identifies environmental obstacles based on the accessed sensor data. For example, the environment mapping circuitry 405 can identify obstacles (e.g., the obstacles 504 of FIGS. 5 and 6, etc.) around the vehicle 100 to create a map of the environment (e.g., the environment 501, etc.) of the vehicle 100. For example, the environment mapping circuitry 405 can access data from the cameras 110A, 110B, and/or the vehicle sensors 112. In some examples, the environment mapping circuitry 405 determine potential obstacles around the vehicle 100 and/or clear paths for the vehicle 100 to operate. In some examples, the environment mapping circuitry 405 can interface with external systems (e.g., sensors associated with the environment 501, etc.) to identify the obstacle in the environment.

At block 908, the friction determiner circuitry 408 and/or motor command circuitry 412 determines the frictional coefficient of the driving surface of the vehicle 100. For example, the friction determiner circuitry 408 can, via the motor command circuitry 412 and/or the brake command circuitry 414, brake a plurality of the wheels of the vehicle 100 (e.g., the first wheel 102A, the second wheel 102B, the third wheel 102C, etc.) and operate an unbraked wheel(s) (e.g., the fourth wheel 102D, etc.) of the vehicle 100 to determine the coefficient of friction of the driving surface. For example, if the wheels 102A, 102B, 102C are fully braked and the third wheel 102C is unbraked, the motor command circuitry 412 can cause the motor 202A to apply power to the first axle 103A. In some such examples, the friction determiner circuitry 408 can determine the friction of the driving surface based on data received from the sensor interface circuitry 402. In such examples, based on the detected rotation of the wheel 102A (e.g., the slippage of the first wheel 102A, etc.) and the weight of the vehicle 100, the friction determiner circuitry 408 can determine the frictional coefficient of the driving surface. Additionally or alternatively, the friction determiner circuitry 408 can determine the frictional coefficient of the driving surface based on any other suitable criteria.

At block 910, the brake command circuitry 414 brakes the wheel at the center of the radius of the turn. For example, the brake command circuitry 414 can cause a first wheel 102A to be fully braked by engaging the first brake 206A. In other examples, the brake command circuitry 414 can fully brake the wheel at the center of the turning radius by any other suitable means.

At block 912, the motor command circuitry 412 and/or the brake command circuitry 414 operates the wheel diagonally opposed to the braked wheel. For example, if the first wheel 102A is fully braked, the motor command circuitry 412 can operate the first motor 202A to cause the rotation of the fourth wheel 102D. In some such examples, the brake command circuitry 414 can cause a wheel on the axle of the diagonally opposed wheel to be fully braked. For example, if the fourth wheel 102D is the diagonally opposed wheel, the brake command circuitry can fully brake the third wheel 102C (e.g., the other wheel on the second axle 103B, etc.) to ensure the second differential 204B distributes the power produced by the second motor 202B to the fourth wheel 102D. In other examples, the motor command circuitry 412 can operate the diagonally opposed wheel by any other suitable means. In some examples, the operation of the diagonally opposed can cause the vehicle 100 to pivot about the fully braked wheel.

At block 914, the turn command analyzer circuitry 406 determines if another pivot is required to complete the turn command. For example, the turn command analyzer circuitry 406 can compare the current position of the vehicle 100 with the desired turn position associated with the turn command. In some such examples, if the vehicle 100 is not in the desired position, the turn command analyzer circuitry 406 can determine another pivot is required. In other examples, the turn command analyzer circuitry 406 can determine if another turn is required by any other suitable means. If the turn command analyzer circuitry 406 determines another pivot is required to complete the turn command, the operations 900 returns to block 910. If the turn command analyzer circuitry 406 determines another pivot is not required, the operations 900 ends.

Figures 10A, 10B:
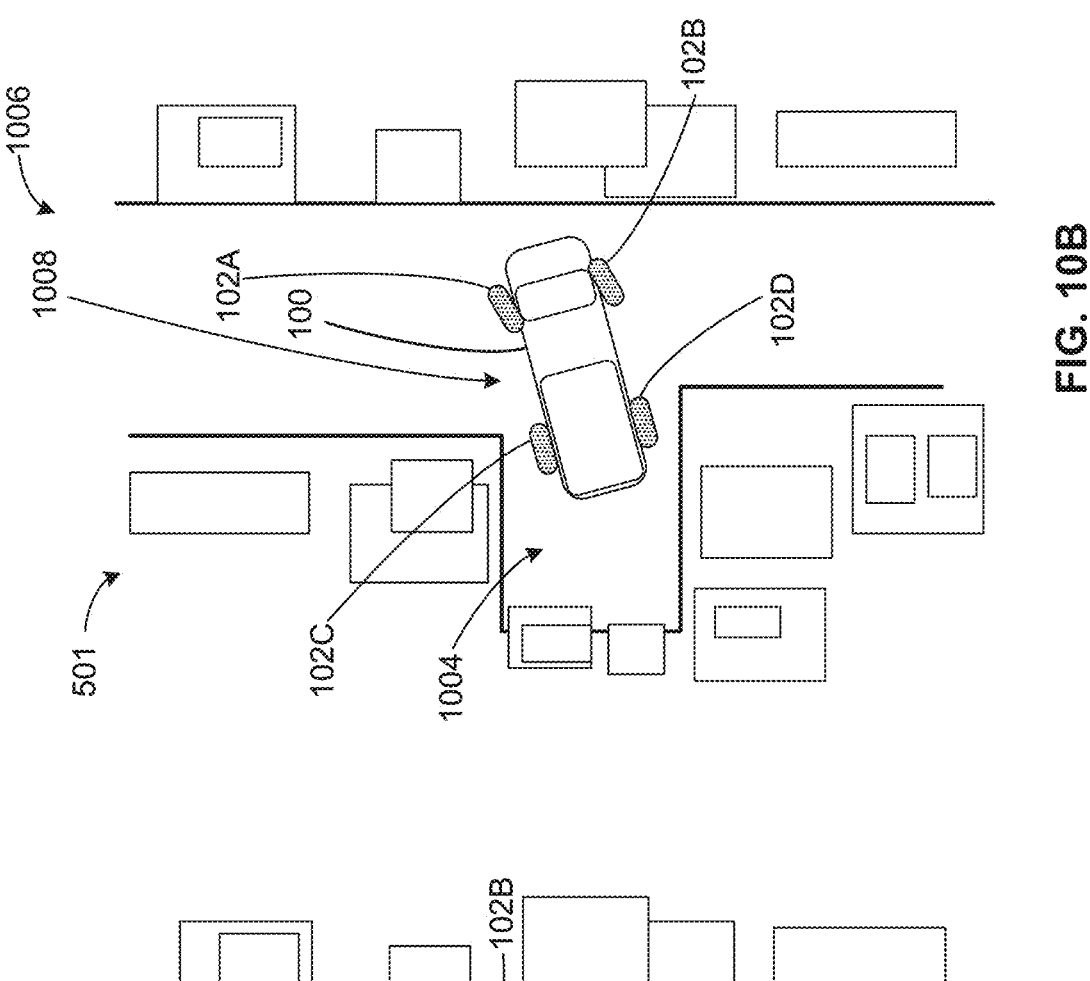
FIGS. 10A and 10B are simplified illustrations of the vehicle of FIG. 1 executing a turn via a second turning method.

FIG. 10A is a simplified illustration of the vehicle 100 of FIG. 1 at an example first position 1000 in the example environment 501 of FIGS. 5A-6B. In the illustrated example of FIG. 10A, the vehicle 100 has been set to execute a turn command to move the vehicle 100 from the example first position 1000 to an example second position 1004. In the illustrated example of FIGS. 10A and 10B, the vehicle 100 executes the turn command via a selective braking technique (e.g., a second turning technique, etc.). In such examples, the brakes of the vehicle 100 (e.g., the brakes 206A, 206B, 206C, 206D of FIG. 2, etc.) can be partially engaged. In some such examples, when the motors of the vehicle 100 (e.g., the motors 202A, 202B of FIG. 2, etc.) are operated, the wheel speed of each of the wheels 102A, 102B, 102C, 102D can be individually controlled based on the distribution of power by the differentials of the vehicle 100 (e.g., the differentials 204A, 204B of FIG. 2, etc.). For example, by increasing the relative braking force applied to the first wheels 102A (e.g., compared to the braking force applied to the other wheels 102B, 102C, 102D, etc.), the first wheel 102A can be slowed compared to other wheels 102B, 102C, 102D. In some such examples, if the first wheel 102A has comparatively greater force applied than the second wheel 102B, the first wheel 102A will rotate faster than the second wheel 102B due to the first differential 204A. The rotational speeds of the second wheel 102B, the third wheel 102C, and the fourth wheel 102D can be similarly controlled by controlling the engagement of the second brake 206B, the third brake 206C, and the fourth brake 206D, respectively. As such, the turning radius of the vehicle 100 can be reduced when compared to known turning techniques.

FIG. 10B is a simplified illustration of the vehicle 100 at an example third position 1008 of FIG. 1 in the example environment 501 of FIGS. 5A-6B. In the illustrated example of FIG. 10A, the vehicle 100 has executed the maneuver illustrated in FIG. 10A and has reached an example third position 1006. In the illustrated example of FIG. 10B, the vehicle 100 can modify the braking force applied to each of the wheels 102A, 102B, 102C, 102D to modify the axis of rotation of the turn, the direction of the turn, and/or the radius of the turn based on the third position 1006 and the second position 1004. In some examples, the vehicle 100 can continuously change the braking force applied to each of the wheels 102A, 102B, 102C, 102D to minimize the turning radius associated with the input turn command.

Figure 11:
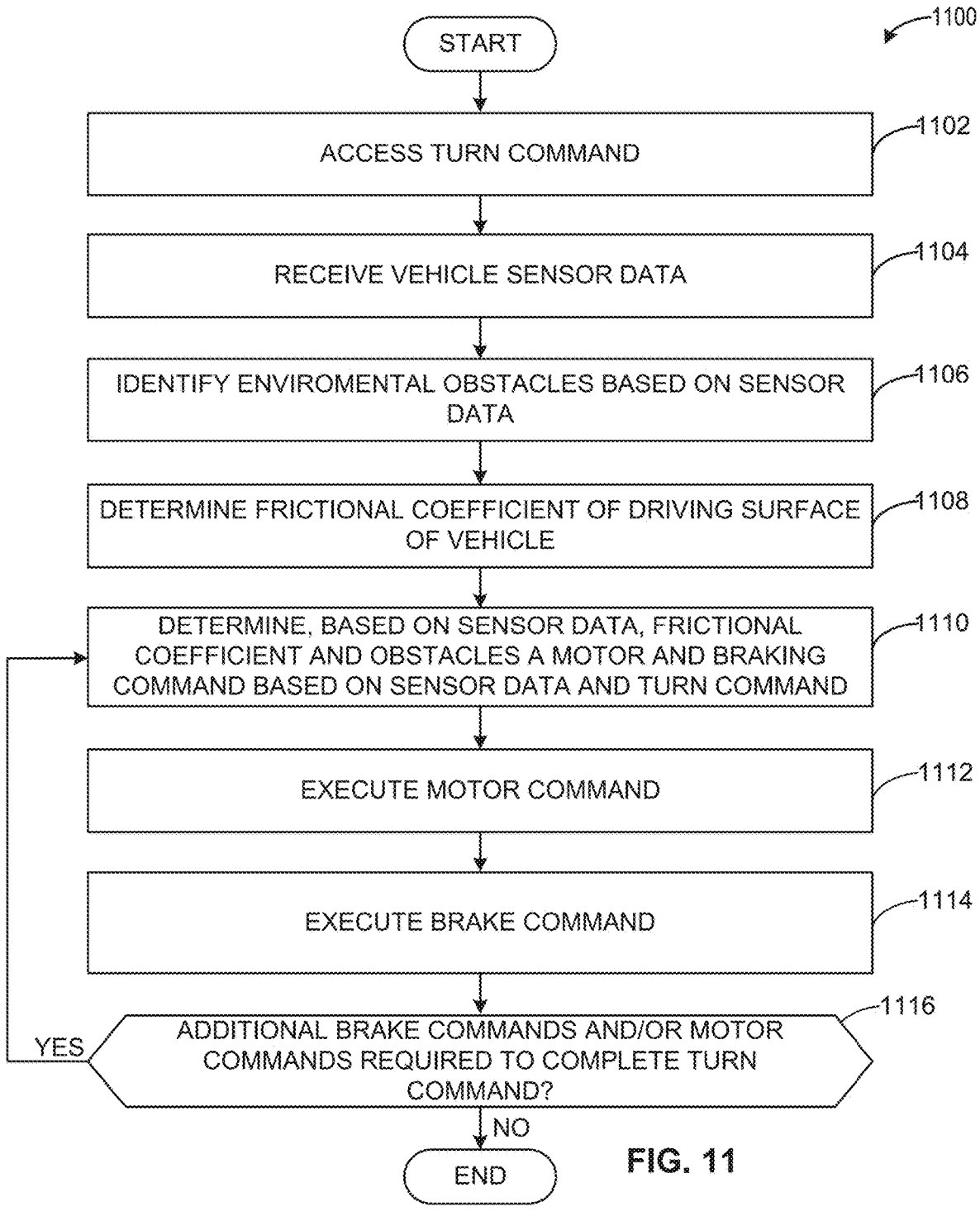
FIG. 11 is a flowchart representative of example machine readable instructions that may be executed by example processor circuitry to implement the controller of FIG. 2 to execute the turn(s) illustrated in FIGS. 10A-10B.

FIG. 11 is a flowchart representative of example machine readable instructions and/or operations 1100 that may be executed by example processor circuitry to implement the controller 104 of FIG. 2 to execute the turn(s) illustrated in FIGS. 10A-10B. The operations 1100 begins at block 1102. At block 1102, the user interface circuitry 404 accesses a turn command. For example, the user interface circuitry 404 can access a turn command input by a user of the vehicle 100 (e.g., via the user interface 106, etc.). In some examples, the user interface circuitry 404 can access a turn command generated by an autonomous driving module of the vehicle 100.

At block 1104, the sensor interface circuitry 402 accesses vehicle sensor data. For example, the sensor interface circuitry 402 can retrieve data from the sensors 112, 208A, 208B, 208C, 208D, and/or other sensors associated with the vehicle 100. In some examples, the sensor interface circuitry 402 can transform the received data from a machine-readable format (e.g., a voltage value, a current value, etc.) into a human-readable format (e.g., a string, a floating-point number, an integer, etc.).

At block 1106, the environment mapping circuitry 405 identifies environmental obstacles based on the accessed sensor data. For example, the environment mapping circuitry 405 can identify obstacles (e.g., the obstacles 504 of FIGS. 5 and 6, etc.) around the vehicle 100 to create a map of the environment (e.g., the environment 501, etc.) of the vehicle 100. For example, the environment mapping circuitry 405 can access data from the cameras 110A, 110B, and/or the vehicle sensors 112. In some examples, the environment mapping circuitry 405 determines potential obstacles around the vehicle 100 and/or clear paths along which the vehicle 100 can travel. In some examples, the environment mapping circuitry 405 can interface with external systems (e.g., sensors associated with the environment 501, etc.) to identify the obstacles in the environment.

At block 1108, the friction determiner circuitry 408 and/or motor command circuitry 412 determines the frictional coefficient of the driving surface of the vehicle 100. For example, the friction determiner circuitry 408 can, via the motor command circuitry 412 and/or the brake command circuitry 414, fully brake a plurality of the wheels of the vehicle 100 (e.g., the first wheel 102A, the second wheel 102B, the third wheel 102C, etc.) and operate an unbraked wheel(s) (e.g., the fourth wheel 102D, etc.) of the vehicle 100 to determine the coefficient of friction of the driving surface. For example, if the wheels 102A, 102B, 102C are fully braked and the third wheel 102C is unbraked, the motor command circuitry 412 can cause the motor 202A to apply power to the first axle 103A. In some such examples, the friction determiner circuitry 408 can determine the friction of the driving surface based on data received from the sensor interface circuitry 402. In such examples, based on the detected rotation of the wheel 102A (e.g., the slippage of the first wheel 102A, etc.) and the weight of the vehicle 100, the friction determiner circuitry 408 can determine the frictional coefficient of the driving surface. Additionally or alternatively, the friction determiner circuitry 408 can determine the frictional coefficient of the driving surface based on any other suitable criteria.

At block 1110, the turn command analyzer circuitry 406 determines, based on the sensor data, the frictional coefficient, and the identified obstacles, a motor and braking command based on the sensor data and the sensor command. For example, the turn command analyzer circuitry 406 can determine a wheel speed for each of the wheels 102A, 102B, 102C, 102D of the vehicle 100 to reduce the turning radius. For example, the turn command analyzer circuitry 406 can reduce the relative wheel speeds of the vehicle 100 by determining a brake command that increases the relative braking force applied to each of the wheels 102A, 102B, 102C, 102D. In some such examples, the greater the relative braking force applied to one of the wheels 102A, 102B, 102C, 102D, the greater the amount of power transferred to other wheel on the axle of the braked wheels (e.g., increasing the braking force applied to the first wheel 102A increases the relative power transferred to the second wheel 102B, etc.). In other examples, the turn command analyzer circuitry 406 can determine any other suitable brake command and/or motor commands.

At block 1112, the motor command circuitry 412 executes the motor command. For example, the motor command circuitry 412 can cause the motors of the vehicle 100 (e.g., the motors 202A, 202B, etc.) to operate in accordance with the motor command determined by the turn command analyzer circuitry 406. At block 1114, the brake command circuitry 414 executes the brake command. For example, the brake command circuitry 414 can cause the brakes of the vehicle 100 (e.g., the brakes 206A, 206B, 206C, 206D, etc.) to operate in accordance with the brake command determined by the turn command analyzer circuitry 406. In some examples, the execution of block 1112 and block 1114 occur simultaneously and/or substantially simultaneously.

At block 1116, the turn command analyzer circuitry 406 determines if additional brake commands and/or motor commands are required to complete the turn command. For example, the turn command analyzer circuitry 406 can compare the current position of the vehicle 100 with the end position of the vehicle 100. In such examples, if the vehicle 100 has not reached the end position, the turn command analyzer circuitry 406 determines additional brake commands and/or motor commands are required to complete the turn command. In other examples, the turn command analyzer circuitry 406 can determine if additional brake commands and motor commands are required to complete the turn command. If the turn command analyzer circuitry 406 determines additional brake commands and/or motor commands required to complete the turn command, the operations 900 returns to block 1110. If the turn command analyzer circuitry 406 determines additional brake commands and/or motor commands are not required to complete the turn command, the operations 900 ends.

The teachings of this disclosure can similarly be applied to execute a turn command via a pseudo-tank turn technique (e.g., a third turning technique, etc.). In such examples, the controller 104 can cause diagonally opposed wheels (e.g., the first wheel 102A and the fourth wheel 102D, etc.) to rotate in opposing directions while fully braking the other wheels of the vehicle 100 (e.g., the second wheel 102B and the third wheel 102C, etc.). In some such examples, the weight of the vehicle 100 can be shifted onto the driven wheels of the vehicle 100 (e.g., the first wheel 102A and the fourth wheel 102D, etc.) by increasing the air pressure of the tires of the driven wheels and reducing the suspension stiffness and/or damping of the braked wheels (e.g., the second wheel 102B and the fourth wheel 102D, etc.). In such examples, the vehicle 100 will execute a tank turn by rotating in place (e.g., with a turning radius of substantially zero, etc.). A similar technique to turn a vehicle is described in U.S. patent application Ser. No. 17/072,789, filed on Oct. 16, 2020, which is hereby incorporated by reference in its entirety.

Figures 12A, 12B:
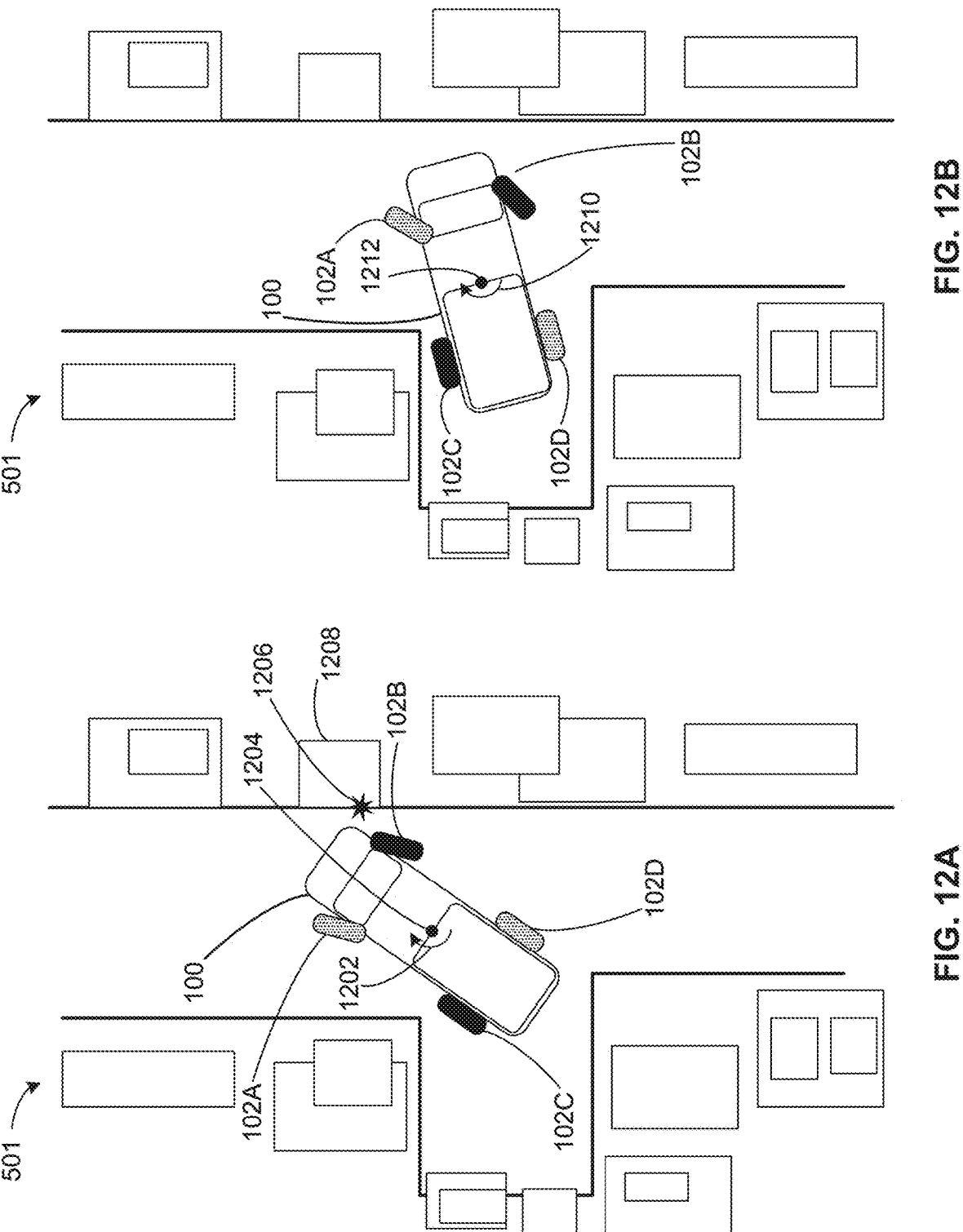
FIGS. 12A and 12B are simplified illustrations of the vehicle of FIG. 1 executing a turn via a third turning method.

FIG. 12A is a simplified illustration of the vehicle 100 of FIG. 1 executing an example first tank turn 1202 about an example first axis of rotation 1204. In the illustrated example of FIG. 12A, the vehicle 100 has fully braked the example second wheel 102B and the example third wheel 102C and is operating the example first wheel 102A and the example fourth wheel 102D, thereby causing the vehicle 100 to execute the example first tank turn 1202 and rotate clockwise. In some such examples, to improve the execution of the first tank turn 1202 by shifting a greater portion of the weight of the vehicle 100 onto the example first wheel 102A and the example fourth wheel 102D, the vehicle 100 can increase the tire pressure of the example first wheel 102A and the example fourth wheel 102D and reduce the suspension damping associated with the second wheel 102B and the example third wheel 102C. In other examples, the vehicle 100 can shift weight off the driven wheels by any other suitable means.

In the illustrated example of FIG. 12A, as the vehicle 100 is executing the first tank turn 1202, the vehicle 100 detects an example potential collision 1206 of the vehicle 100 with an example obstacle 1208. For example, the vehicle 100 can detect (e.g., via the cameras 110A, 110B and/or the sensors 112, etc.) the location of the obstacle 1208 and compare the location of the obstacle 1208 with a projected path of the first tank turn 1202. In some examples, after detecting the potential collision 1206, the vehicle 100 can stop executing the first tank turn 1202 (e.g., after rotating the vehicle 100 a first angular distance, prior to the potential collision 1206, etc.) and/or can alert a user of the potential collision 1206 (e.g., via the user interface 106 of FIGS. 1 and 3, etc.) and/or stop executing the first tank turn 1202. Additionally or alternatively, starting from the new rotational position of the vehicle 100, the vehicle 100 can shift the axis of rotation from the first axis of rotation 1204 to an axis of rotation that does not result in the potential collision 1206. An example where the vehicle 100 shifts axis of rotation is described below in conjunction with FIG. 12B.

FIG. 12B is a simplified illustration of the vehicle 100 of FIG. 1 executing an example second tank turn 1210 about an example second axis of rotation 1212 following the first tank turn 1202 of FIG. 12A. In the illustrated example of FIG. 12B, the vehicle 100 has shifted the axis of rotation of the vehicle 100 from the first axis of rotation 1204 to the second rotation 1212. That is, the vehicle 100 has stopped executing the first tank turn 1202, moved locations in the environment, and the begun executing the tank turn 1210. For example, the vehicle 100 can shift the axis of rotation to the second axis of rotation by executing additional braking commands and motor commands. In some examples, the vehicle 100 can fully brake the third wheel 102C and operate one of the other wheels 102A, 102B, 102D to pivot about the third wheel 102C (e.g., temporarily shifting the axis of rotation to the third wheel 102C, etc.). In other examples, the vehicle 100 can execute a motor command to move the vehicle 100 in a direction along the longitudinal axis of the vehicle 100. In other examples, the vehicle 100 can shift the axis of rotation by any other suitable means. In the illustrated example of FIG. 12B, after shifting the axis of rotation of the vehicle to the second axis of rotation 1212, the vehicle 100 executes the second tank turn 1210 about an example second axis of rotation 1212.

Figure 13:
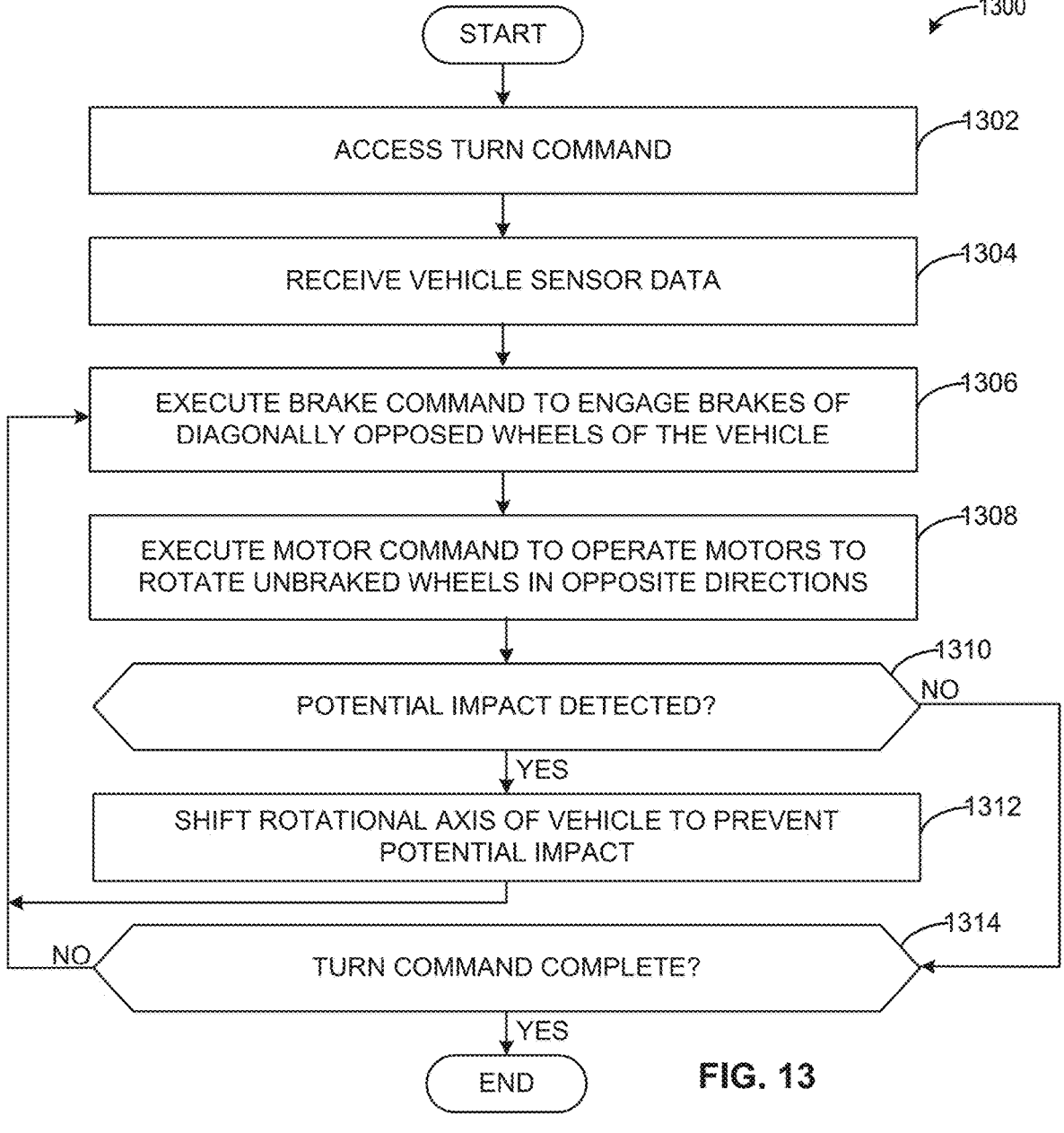
FIG. 13 is a flowchart representative of example machine readable instructions that may be executed by example processor circuitry to implement the controller of FIG. 2 to execute the turn(s) illustrated in FIGS. 12A-12B.

FIG. 13 is a flowchart representative of example machine readable instructions and/or operations 1300 that may be executed by example processor circuitry to implement the controller of FIG. 4 to execute the turn(s) illustrated in FIGS. 12A-12B. The operations 1300 beings at block 1302. At block 1302, the user interface circuitry 404 accesses a turn command. For example, the user interface circuitry 404 can access a turn command input by a user of the vehicle 100 (e.g., via the user interface 106, etc.). In some examples, the user interface circuitry 404 can access a turn command generated by an autonomous driving module of the vehicle 100. In some examples, the received turn command can include a command to execute a tank turn. In other examples, the tank turn can include a command to execute a turn with a comparatively small turning radius.

At block 1304, the sensor interface circuitry 402 accesses vehicle sensor data. For example, the sensor interface circuitry 402 can retrieve data from the sensors 112, 208A, 208B, 208C, 208D, and/or other sensors associated with the vehicle 100. In some examples, the sensor interface circuitry 402 can transform the received data from a machine-readable format (e.g., a voltage value, a current value, etc.) into a human-readable format (e.g., a string, a floating-point number, an integer, etc.).

At block 1306, the brake command circuitry 414 executes a brake command to engage the brakes of diagonally opposed wheels the vehicle 100. For example, the brake command circuitry 414 can engage the brakes of (1) the first wheel 102A and the fourth wheel 102D (e.g., the first brake 206A and the fourth brake 206D, etc.) or (2) the second wheel 102B and the third wheel 102C (e.g., the second brake 206B and the third brake 206C, etc.).

At block 1308, the motor command circuitry 412 executes a motor command to operate the motors 202A, 202B of the vehicle 100 to rotate the unbraked wheels in opposite directions. For example, if the first wheel 102A and the fourth wheel 102D are braked, the motor command circuitry 412 can execute a motor command to rotate the second wheel 102B in reverse (e.g., counterclockwise, etc.) and the third wheel 102C in forward (e.g., clockwise, etc.), thereby causing the vehicle 100 to rotate clockwise. In other examples, if the first wheel 102A and the fourth wheel 102D are braked, the motor command circuitry 412 can execute a motor command to rotate the second wheel 102B in forward (e.g., clockwise, etc.) and the third wheel 102C in reverse (e.g., counterclockwise, etc.), thereby causing the vehicle 100 to rotate counterclockwise.

At block 1310, the environment mapping circuitry 405 determines if a potential impact is detected. For example, the environment mapping circuitry 405 can analyze the received sensor data (e.g., data from the cameras 110A, 110B and/or the sensors 112, etc.) to identify nearby obstacles (e.g., the obstacle 1208 of FIG. 12A, etc.) in the environment (e.g., the environment 501 of FIGS. 12A and 12B, etc.) of the vehicle 100. In such examples, the environment mapping circuitry 405 compares a projected path of the vehicle 100 along the executed tank turn with identified obstacles to identify a potential impact (e.g., the potential collision 1206 of FIG. 12A, etc.). In other examples, the environment mapping circuitry 405 can detect if a potential impact could occur by any other suitable means. If the environment mapping circuitry 405 detects a potential impact, the operations 1300 advance to block 1312. If the environment mapping circuitry 405 does not detect a potential impact, the operations 1300 advances to block 1314.

At block 1312, the motor command circuitry 412 and/or the brake command circuitry 414 shifts the rotational axis of the vehicle 100 to avoid the potential impact. For example, the motor command circuitry 412 and/or the brake command circuitry 414 can execute commands to move the location on the environment 501 at which the vehicle 100 rotates about. In some examples, the brake command circuitry 414 can execute a brake command to fully brake the third wheel 102C and the motor command circuitry 412 can operate one of the other wheels 102A, 102B, 102D, thereby causing the vehicle 100 to pivot about the third wheel 102C (e.g., temporarily shifting the axis of rotation to the third wheel 102C, etc.). In other examples, the motor command circuitry 412 can execute a motor command to move the vehicle 100 in a direction along the longitudinal axis of the vehicle 100. In other examples, the vehicle 100 can shift the axis of rotation by any other suitable means.

At block 1314, the turn command analyzer circuitry 406 determines if the received turn command is complete. For example, the turn command analyzer circuitry 406 can compare the current position of the vehicle 100 with the desired position of the vehicle 100 to determine if the turn command has been completed. In other examples, the turn command analyzer circuitry 406 can determine if the turn command has been completed by any other suitable means. If the turn command analyzer circuitry 406 determines the turn command has been completed, the operations 1300 end. If the turn command analyzer circuitry 406 determines the turn command is not complete, the operations 1300 return to block 1306.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 14:
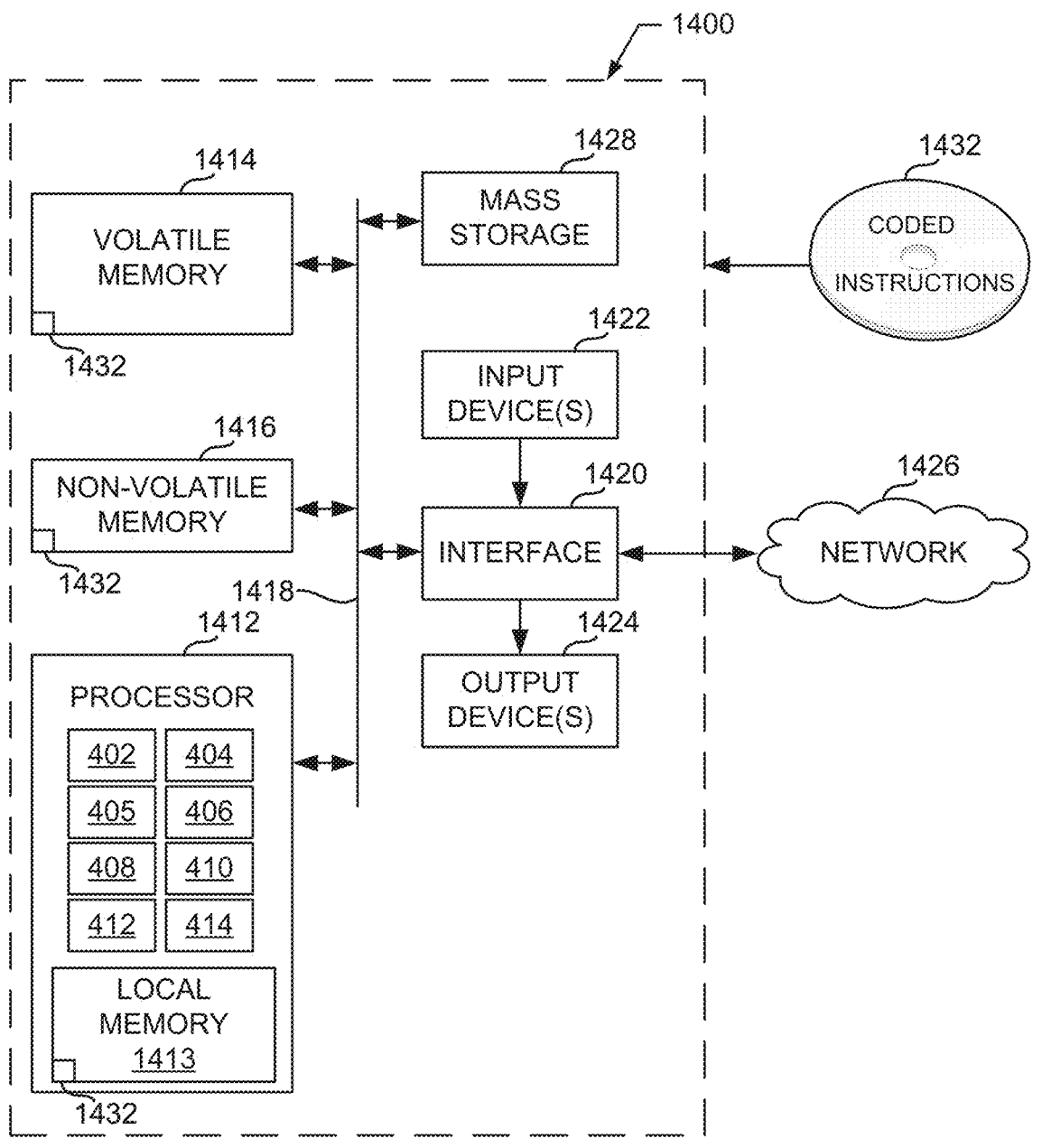
FIG. 14 is a block diagram of an example processing platform including processor circuitry structured to execute the example machine readable instructions of FIGS. 7, 9, 11, and 13 to implement the controller of FIG. 2.

FIG. 14 is a block diagram of an example processor platform 1400 structured to execute and/or instantiate the machine readable instructions and/or operations 700, 900, 1100, 1300 of FIGS. 7, 9, 11, and 13 to implement the controller 104 of FIGS. 1 and 4. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a Blu-ray player, a gaming console, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs micropro-cessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example sensor interface circuitry 402, the example user interface circuitry 404, the environment mapping circuitry 405, the example turn command analyzer circuitry 406, the example friction determiner circuitry 408, the example recommendation generator circuitry 410, the example motor command circuitry 412, and the example brake command circuitry 414.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 7, 9, 11, and 13, may be stored in the mass storage device 1428, in the volatile memory 1414, in the non-volatile memory 1416, and/or on a removable non-transitory computer readable storage medium such as a CD or DVD.

Figure 15:
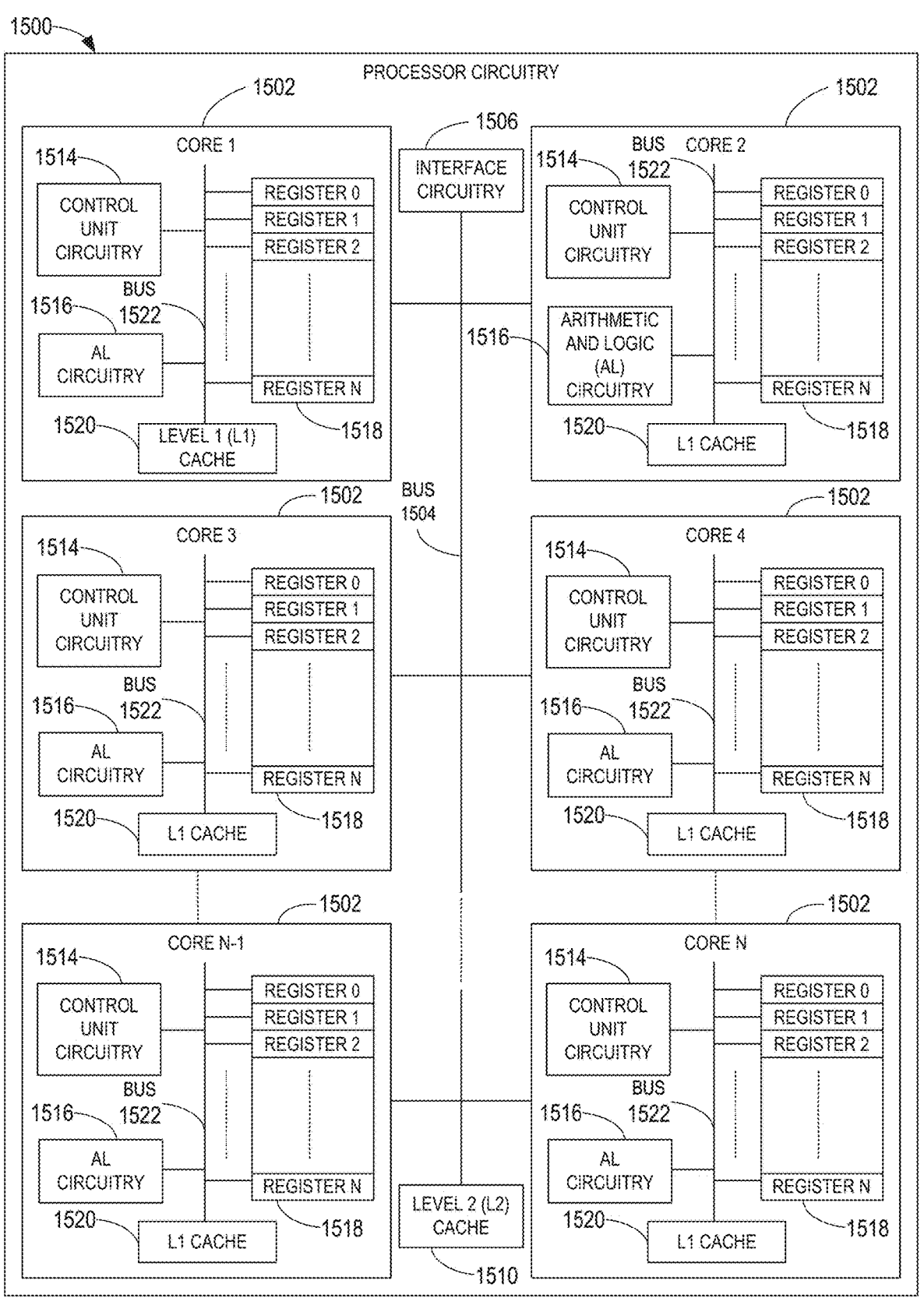
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a microprocessor 1500. For example, the microprocessor __00 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operation represented by the flowchart of FIGS. 7, 9, 11, and 13.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1520 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operation on the data within the corresponding core 1502. The AL circuitry 1516 of some examples performs integer based operation. In other examples, the AL circuitry 1516 also performs floating point operation. In yet other examples, the AL circuitry 1516 may include first AL circuitry that performs integer based operation and second AL circuitry that performs floating point operation. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1522 may implement at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
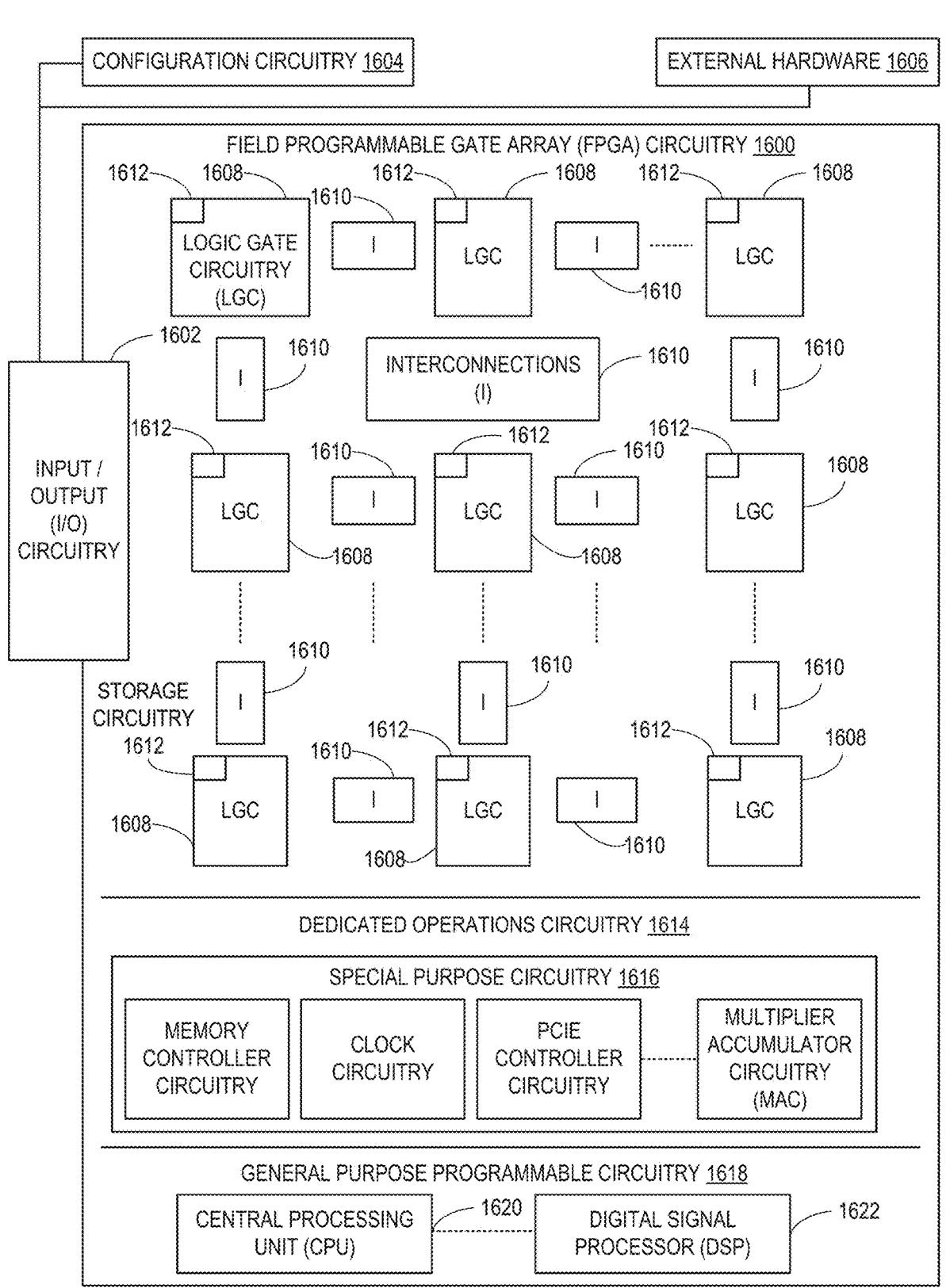
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. The FPGA circuitry 1600 can be used, for example, to perform operation that could otherwise be performed by the example microprocessor 1500 of FIG. 15 executing corresponding machine readable instructions. However, once configured, the FPGA circuitry 1600 instantiates the machine readable instructions in hardware and, thus, can often execute the operation faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowchart of FIGS. 7, 9, 11, and 13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 7, 9, 11, and 13. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operation on data received by input circuitry. Those operation may correspond to some or all of the software represented by the flowcharts of FIGS. 7, 9, 11, and 13. As such, the FPGA circuitry 1600 may be structured to effectively instantiate some or all of the machine readable instructions of the flowcharts of FIGS. 7, 9, 11, and 13 as dedicated logic circuits to perform the operation corresponding to those software instructions in a dedicated manner analogous to an ASIC. Therefore, the FPGA circuitry 1600 may perform the operation corresponding to the some or all of the machine readable instructions of FIGS. 7, 9, 11, and 13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operation that may correspond to at least some of the machine readable instructions of FIGS. 7, 9, 11, and 13 and/or other desired operation. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operation. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operation Circuitry 1614. In this example, the Dedicated Operation Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operation.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 6. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowchart of FIGS. 7, 9, 11, and 13 may be executed by one or more of the cores 1502 of FIG. 15 and a second portion of the machine readable instructions represented by the flowcharts of FIGS. 7, 9, 11, and 13 may be executed by the FPGA circuitry 1600 of FIG. 16.

In some examples, the processor circuitry 1412 of FIG. 14 may be in one or more packages. For example, the processor circuitry 1412 of FIG. 14 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Example methods, apparatus, systems, and articles of manufacture to methods and apparatus for vehicle turning in confined spaces are disclosed herein. Further examples and combinations thereof include the following:

Example 1 includes an apparatus comprising instructions, at least one memory, a processor to execute the instructions to operate a first brake of a first wheel of a vehicle, operate a second brake of a second wheel of the vehicle, determine a frictional coefficient of a driving surface of the vehicle by rotating a third wheel of the vehicle, determine based on the frictional coefficient, if a turn command can be conducted by the vehicle, and when the turn command can be conducted, conduct the turn command.

Example 2 includes the apparatus of example 1, wherein the processor further executes the instructions to operate a third brake of a fourth wheel of the vehicle.

Example 3 includes the apparatus of example 1, wherein the vehicle is an electric vehicle and the rotating the third wheel of the vehicle includes the processor executing the instructions to operate a first motor of the vehicle.

Example 4 includes the apparatus of example 1, wherein the processor further executes the instructions to, when the turn command cannot be conducted, alert a user of the vehicle to change the frictional coefficient of the driving surface.

Example 5 includes the apparatus of example 4, wherein the processor executes the instructions to alert the user of the vehicle to change the frictional coefficient of the driving surface by at least one of generating a first recommendation to increase the frictional coefficient of a pivot wheel associated with the turn command, or generating a second recommendation to decrease the frictional coefficient of a driven wheel associated with the turn command.

Example 6 includes the apparatus of example 1, wherein the processor executes the instructions to access the turn command, determine, via a sensor of the vehicle, a first turning radius associated with the turn command based on an environment associated with the vehicle, and wherein the processor executes the instructions to determine if the turn command can be conducted by the vehicle by comparing the first turning radius with a second turning radius, the second turning radius based on the frictional coefficient.

Example 7 includes the apparatus of example 1, wherein the processor executes the instructions to conduct the turn command by alerting a user of the vehicle to execute the turn command.

Example 8 includes an apparatus comprising instructions, at least one memory, a processor to execute the instructions to access a turn command, the turn command to move a vehicle from a first position to a second position, determine, based on the turn command and the first position, a first brake command and a first motor command, the first brake command to brake a first brake of the vehicle, the first motor command to operate a first motor of the vehicle, and execute, substantially simultaneously, the first brake command and the first motor command, to move the vehicle from the first position to the second position.

Example 9 includes the apparatus of example 8, wherein the first brake command includes fully braking the first brake and the first motor command causes a rotation of a first wheel, the first brake associated with a second wheel, the first wheel diagonally opposed to the second wheel.

Example 10 includes the apparatus of example 8, wherein the processor further executes the instructions to determine, by executing a third braking command and a third motor command, a frictional coefficient of a driving surface of the vehicle, wherein at least one of the first braking command or the first motor command is based on the frictional coefficient.

Example 11 includes the apparatus of example 10, wherein the third braking command includes fully braking a first wheel, a second wheel, and a third wheel, and the third motor command includes causing a rotation of a fourth wheel of the vehicle.

Example 12 includes the apparatus of example 10, wherein at least one of the first braking command or the first motor command is executed via an autonomous driving controller of the vehicle.

Example 13 includes the apparatus of example 10, wherein the first motor command causes the first motor to drive a first wheel in a first direction and causes a second motor to drive a second wheel in a second direction, the first direction different than the second direction.

Example 14 includes the apparatus of example 10, wherein the first brake command causes the first brake to partially brake a first wheel of the vehicle.

Example 15 includes a method comprising accessing a turn command, the turn command to move a vehicle from a first position to a second position, determining, based on the turn command and the first position, a first brake command and a first motor command, the first brake command to brake a first brake of the vehicle, the first motor command to operate a first motor of the vehicle, and executing, substantially simultaneously, the first brake command and the first motor command, to move the vehicle from the first position to the second position.

Example 16 includes the method of example 15, wherein the first brake command includes fully braking the first brake and the first motor command causes a rotation of a first wheel, the first brake associated with a second wheel, the first wheel diagonally opposed to the second wheel.

Example 17 includes the method of example 15, furthering including determining a frictional coefficient of a driving surface of the vehicle by executing a third braking command and a third motor command, wherein at least one of the first braking command or the first motor command is based on the frictional coefficient.

Example 18 includes the method of example 17, wherein the third braking command includes fully braking a first wheel, a second wheel, and a third wheel, and the third motor command includes causing a rotation of a fourth wheel of the vehicle.

Example 19 includes the method of example 15, wherein the first motor command causes the first motor to drive a first wheel in a first direction and causes a second motor to drive a second wheel in a second direction, the first direction different than the second direction.

Example 20 includes the method of example 15, wherein the first brake command causes the first brake to partially brake a first wheel of the vehicle.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
instructions;
at least one memory;
a processor to execute the instructions to:
    engage a first brake of a first wheel of a vehicle;
    engage a second brake of a second wheel of the vehicle;
    determine a frictional coefficient of a driving surface of the vehicle by rotating a third wheel of the vehicle while the first and second brakes are engaged and fully braked;
    determine based on the frictional coefficient, if a turn command can be executed by the vehicle; and
    when the turn command can be conducted, conduct the turn command.

2. The apparatus of claim 1, wherein the processor further executes the instructions to operate a third brake of a fourth wheel of the vehicle.

3. The apparatus of claim 1, wherein the vehicle is an electric vehicle and the rotating the third wheel of the vehicle includes the processor executing the instructions to operate a first motor of the vehicle.

4. The apparatus of claim 1, wherein the processor further executes the instructions to, when the turn command cannot be executed, alert a user of the vehicle to change the frictional coefficient of the driving surface.

5. The apparatus of claim 4, wherein the processor executes the instructions to alert the user of the vehicle to change the frictional coefficient of the driving surface by at least one of:
    generating a first recommendation to increase the frictional coefficient of a pivot wheel associated with the turn command by modifying the driving surface of the vehicle; or
    generating a second recommendation to decrease the frictional coefficient of a driven wheel associated with the turn command by modifying the driving surface of the vehicle.

6. The apparatus of claim 1, wherein the processor executes the instructions to:

access the turn command; and determine, via a sensor of the vehicle, a first turning radius associated with the turn command based on an environment associated with the vehicle, wherein the processor executes the instructions to determine if the turn command can be executed by the vehicle by comparing the first turning radius with a second turning radius, the second turning radius based on the frictional coefficient.

7. The apparatus of claim 1, wherein the processor executes the instructions to conduct the turn command after alerting a user of the vehicle to execute the turn command.

8. An apparatus comprising:

instructions;

at least one memory;

a processor to execute the instructions to:

access a turn command, the turn command to move a vehicle from a first position to a second position;

determine, based on the turn command and the first position, a first brake command and a first motor command before executing the turn command, the first brake command to brake a first brake of the vehicle, the first motor command to operate a first motor of the vehicle; and execute the first brake command while executing the first motor command, to move the vehicle from the first position to the second position, the first motor command to cause a rotation of a first wheel of the vehicle about a lateral axis of the vehicle.

9. The apparatus of claim 8, wherein the first brake command includes fully braking the first brake, the first brake associated with a second wheel, the first wheel diagonally opposed to the second wheel.

10. The apparatus of claim 8, wherein the processor further executes the instructions to determine, by executing a third brake command and a third motor command, a frictional coefficient of a driving surface of the vehicle, wherein at least one of the first brake command or the first motor command is based on the frictional coefficient.

11. The apparatus of claim 10, wherein the rotation is a first rotation, the third brake command includes fully braking the first wheel, a second wheel, and a third wheel, and the third motor command includes causing a second rotation of a fourth wheel of the vehicle.

12. The apparatus of claim 10, wherein at least one of the first brake command or the first motor command is executed via an autonomous driving controller of the vehicle.

13. The apparatus of claim 10, wherein the first motor command causes the first motor to drive the first wheel in a first direction and causes a second motor to drive a second wheel in a second direction, the first direction different than the second direction.

14. The apparatus of claim 10, wherein the first brake command causes the first brake to partially brake the first wheel.

15. A method comprising:

accessing a turn command, the turn command to move a vehicle from a first position to a second position;

determining, based on the turn command and the first position, a first brake command and a first motor command before executing the turn command, the first brake command to brake a first brake of the vehicle, the first motor command to operate a first motor of the vehicle; and executing the first brake command while executing the first motor command, to move the vehicle from the first position to the second position, the first motor command to cause a rotation of a first wheel of the vehicle about a lateral axis of the vehicle.

16. The method of claim 15, wherein the first brake command includes fully braking the first brake, the first brake associated with a second wheel, the first wheel diagonally opposed to the second wheel.

17. The method of claim 15, further including determining a frictional coefficient of a driving surface of the vehicle by executing a third brake command and a third motor command, wherein at least one of the first brake command or the first motor command is based on the frictional coefficient.

18. The method of claim 17, wherein the rotation is a first rotation, the third brake command includes fully braking the first wheel, a second wheel, and a third wheel, and the third motor command includes causing a second rotation of a fourth wheel of the vehicle.

19. The method of claim 15, wherein the first motor command causes the first motor to drive the first wheel in a first direction and causes a second motor to drive a second wheel in a second direction, the first direction different than the second direction.

20. The method of claim 15, wherein the first brake command causes the first brake to partially brake the first wheel of the vehicle.

* * * * *